No. 831,633. PATENTED SEPT. 25, 1906.
A. SCHNEIDER & J. PERFLER.
CALCULATING MACHINE.
APPLICATION FILED APR. 30, 1903.
14 SHEETS—SHEET 1.
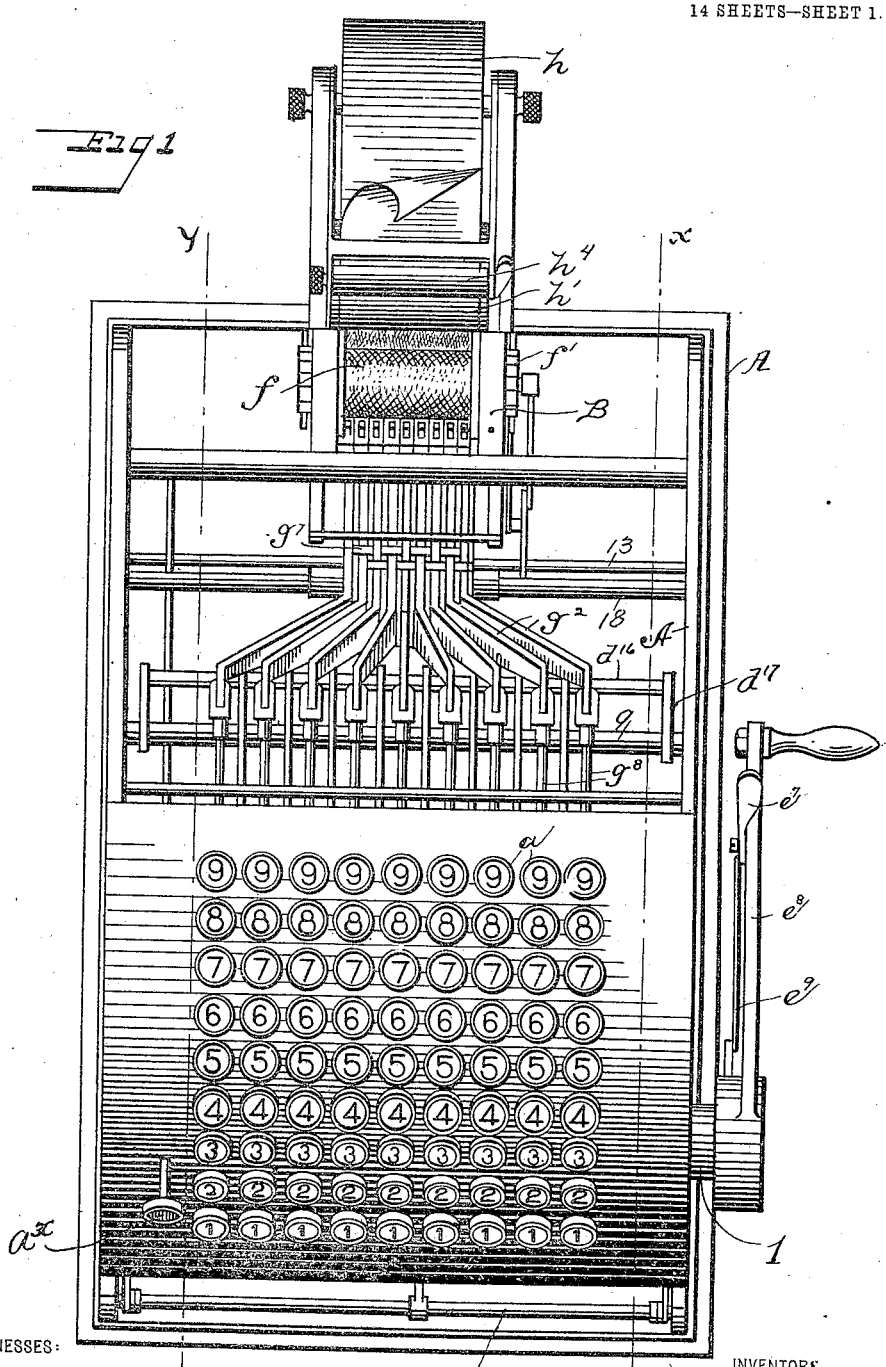

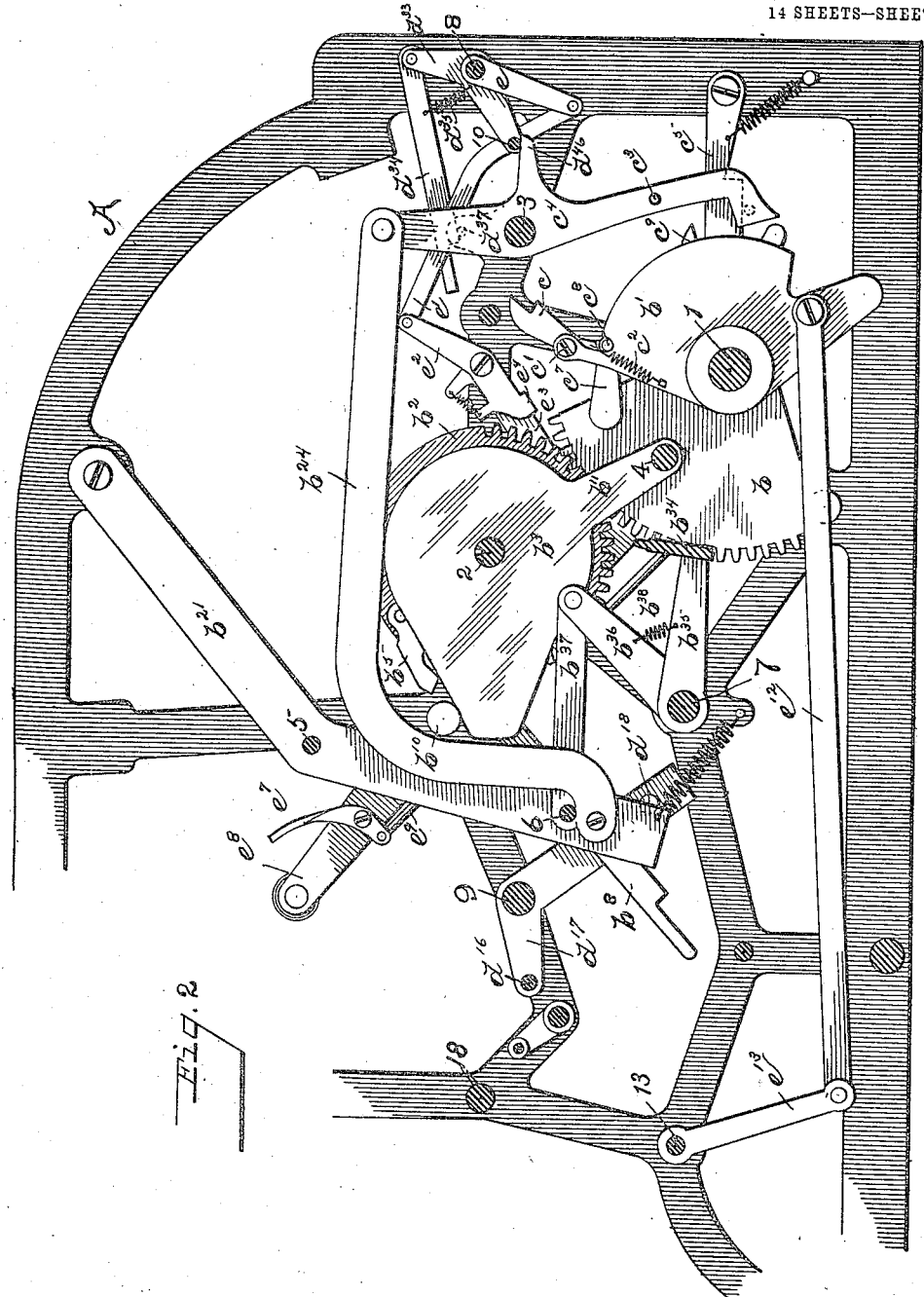

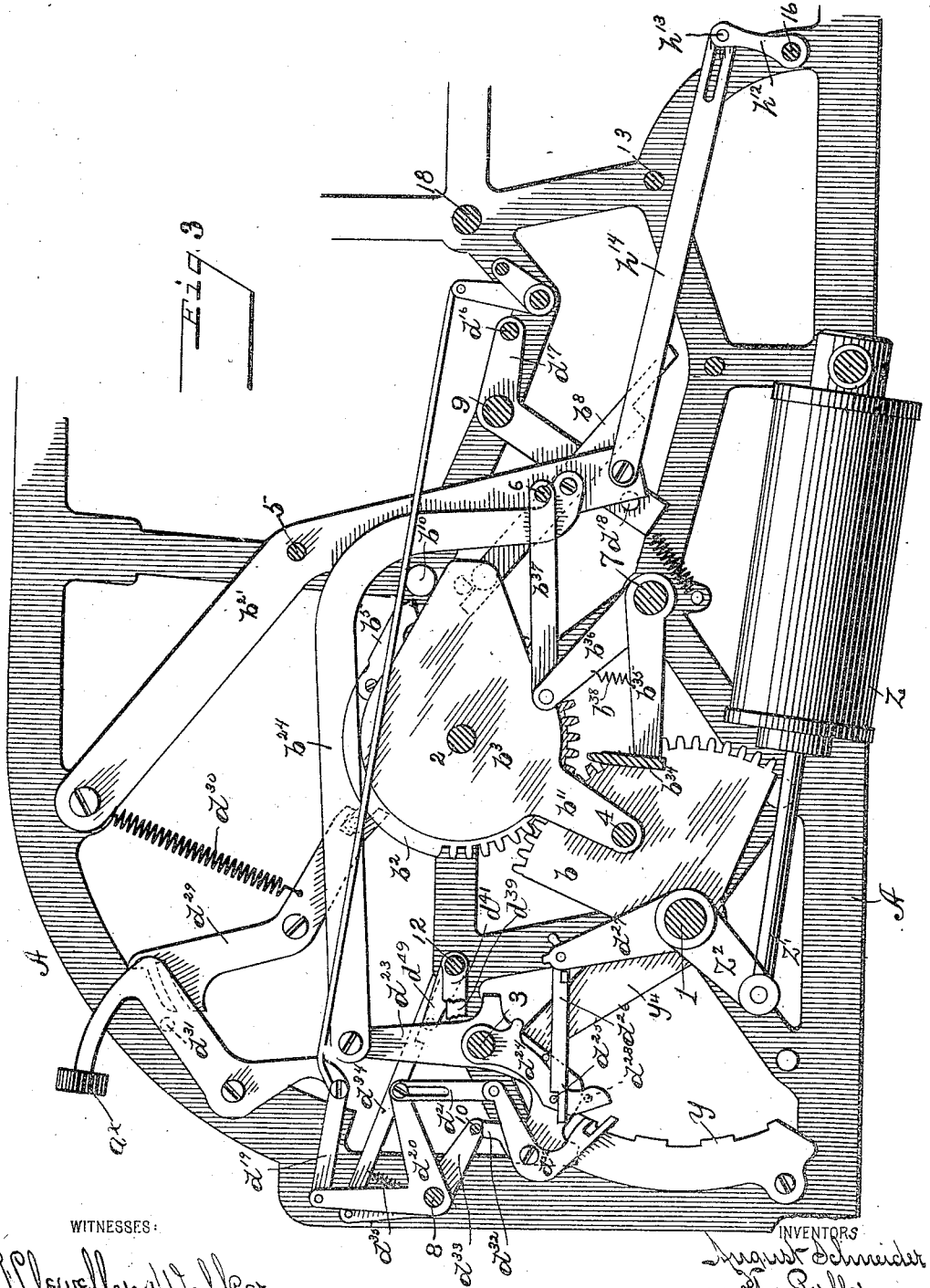

No. 831,633. PATENTED SEPT. 25, 1906.
A. SCHNEIDER & J. PERFLER.
CALCULATING MACHINE.
APPLICATION FILED APR. 30, 1903.
14 SHEETS—SHEET 4.
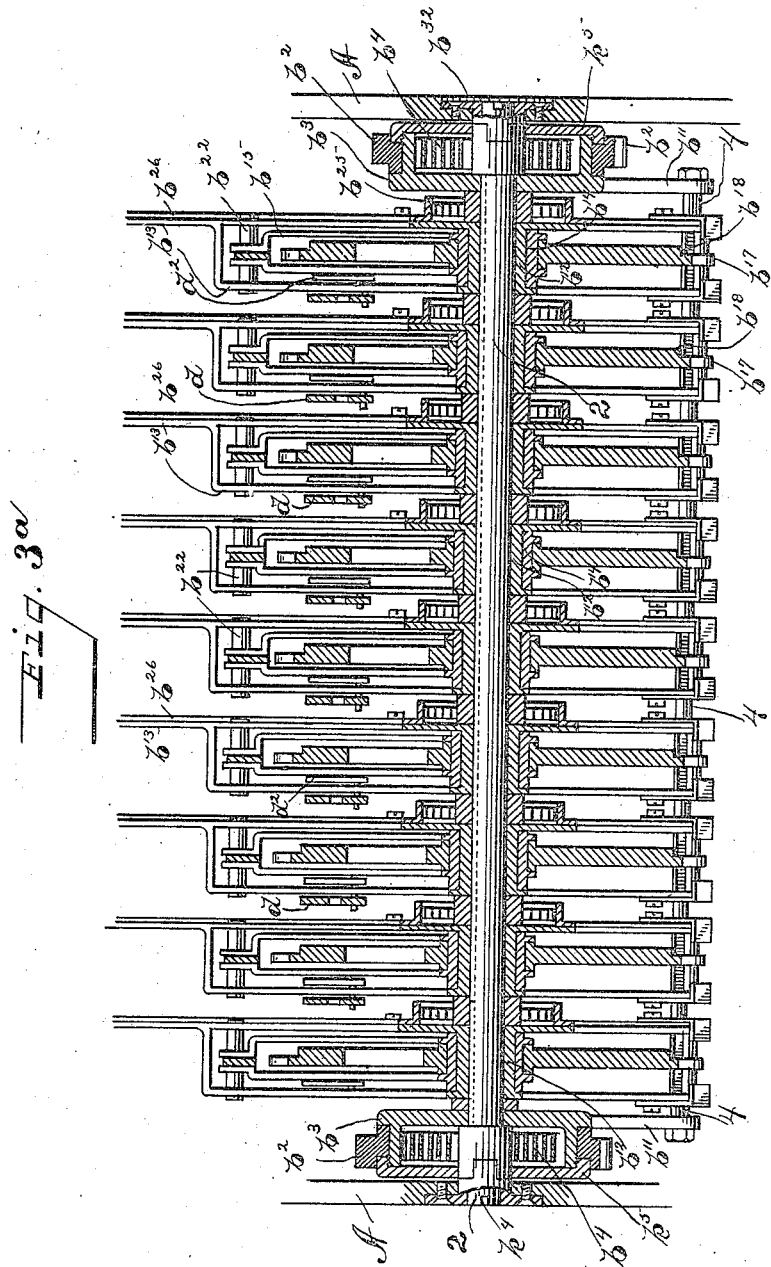

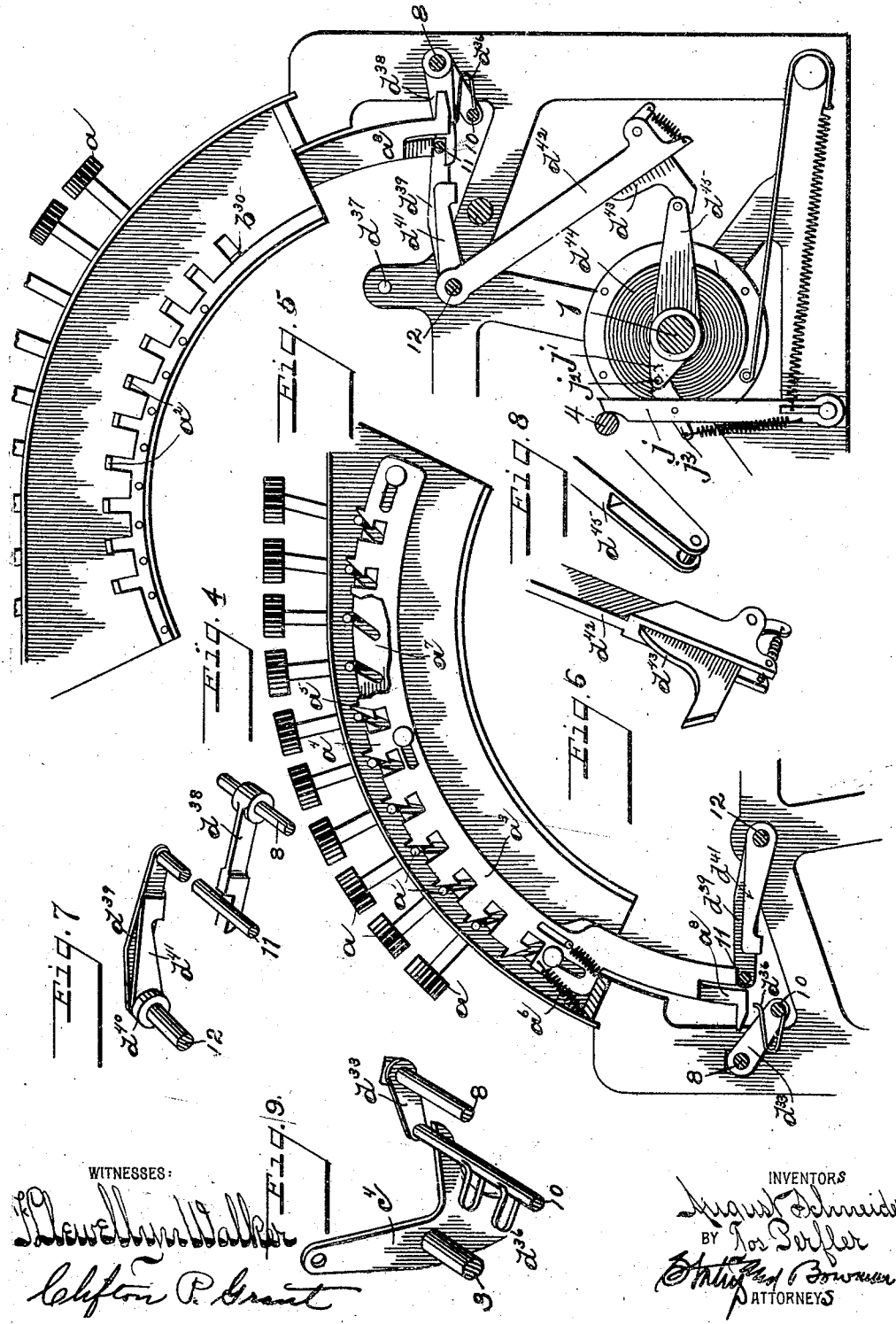

No. 831,633. PATENTED SEPT. 25, 1906.
A. SCHNEIDER & J. PERFLER.
CALCULATING MACHINE.
APPLICATION FILED APR. 30, 1903.
14 SHEETS—SHEET 6.
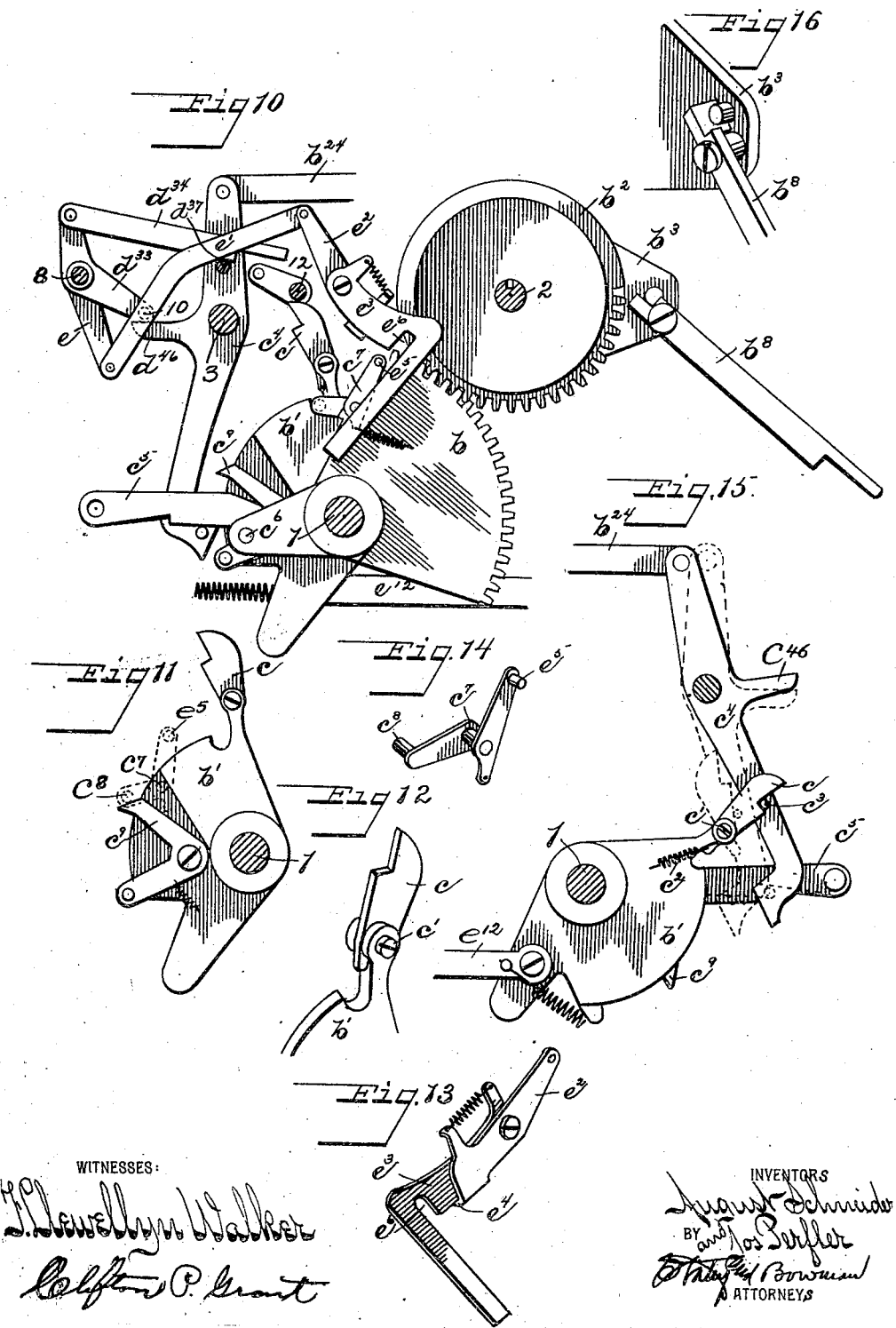

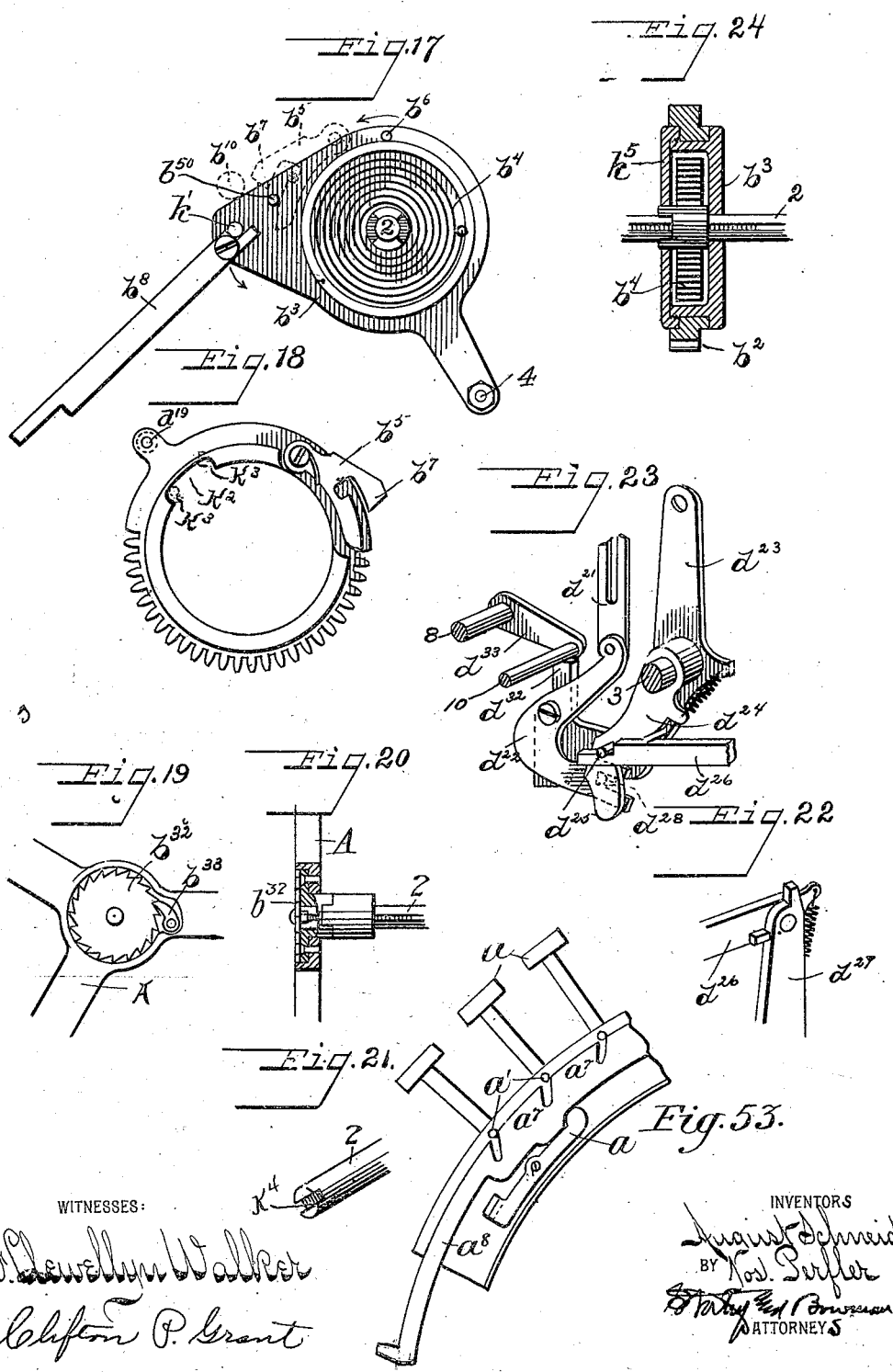

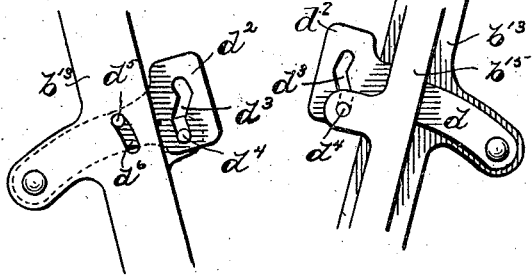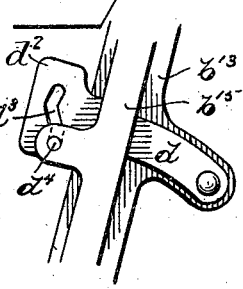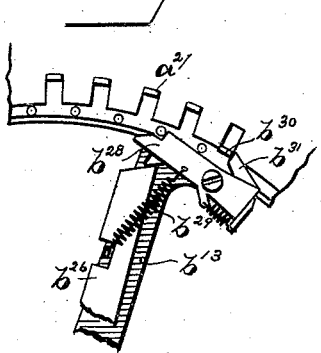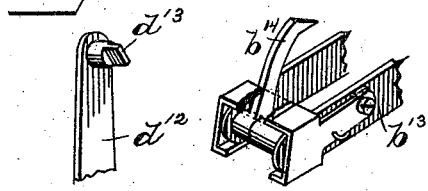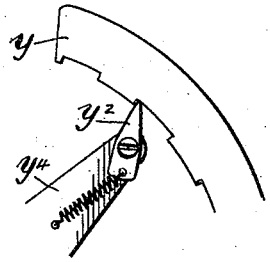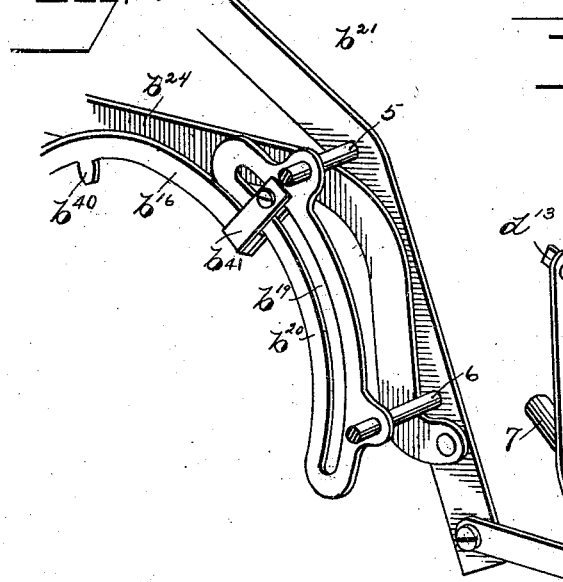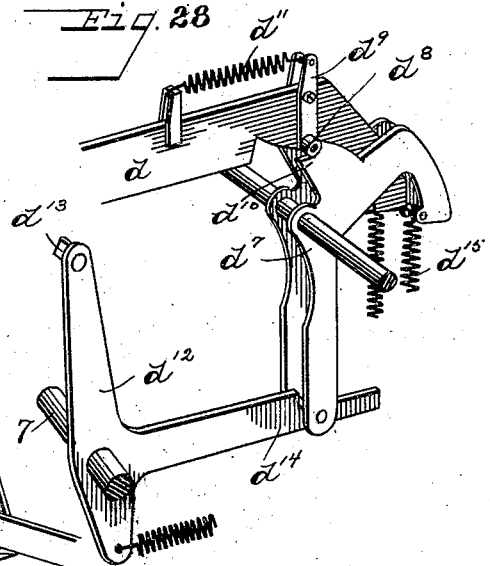

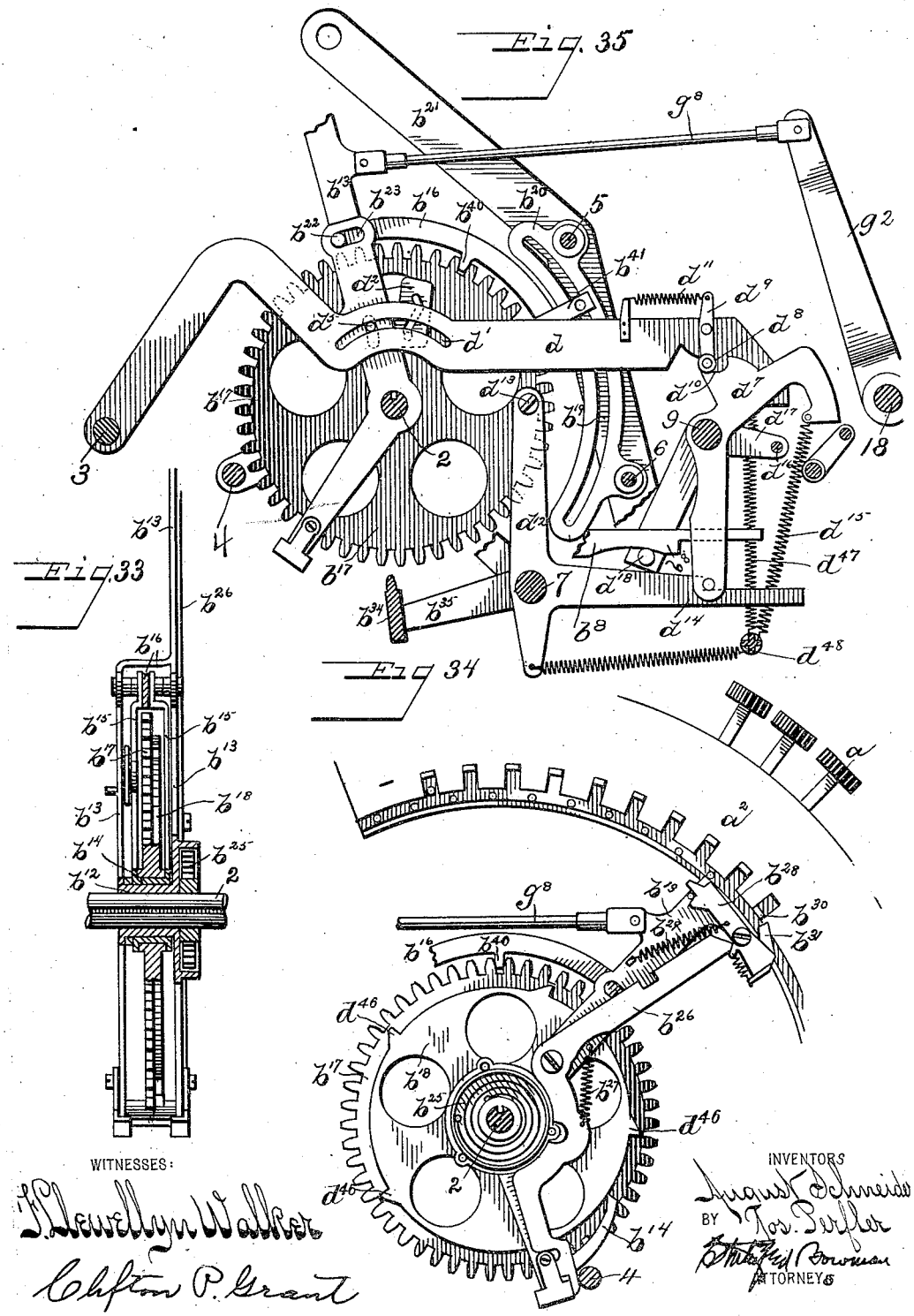

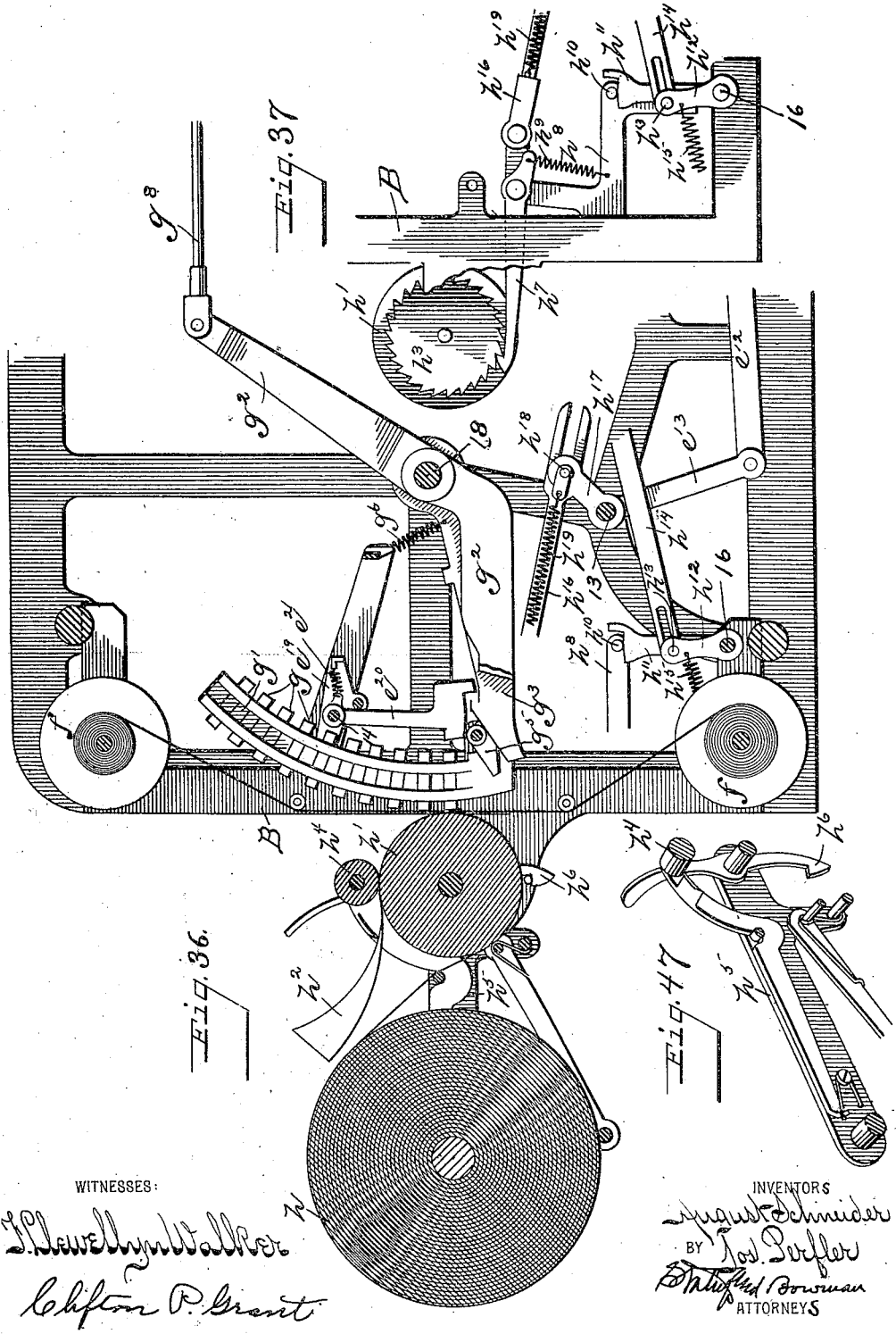

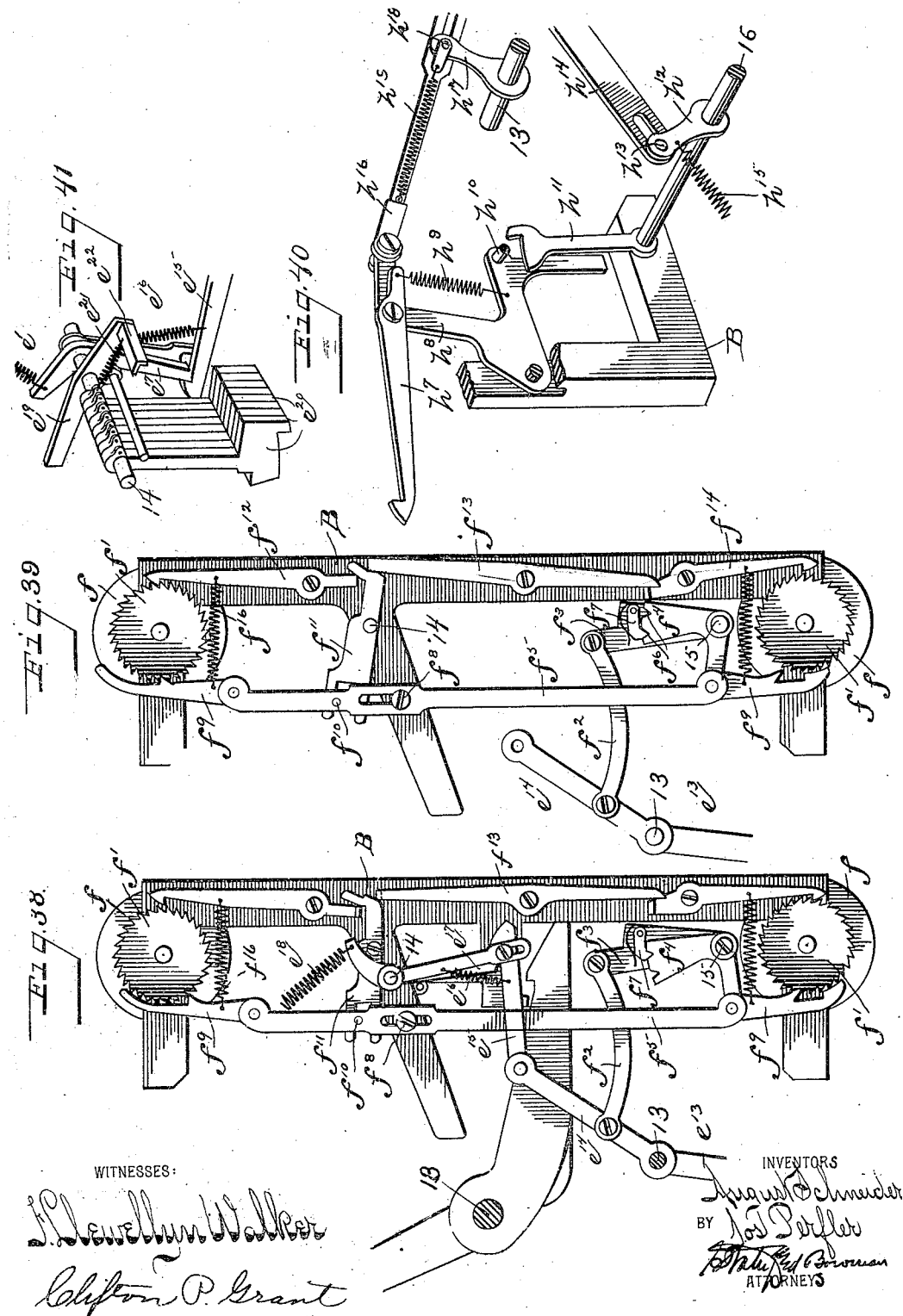

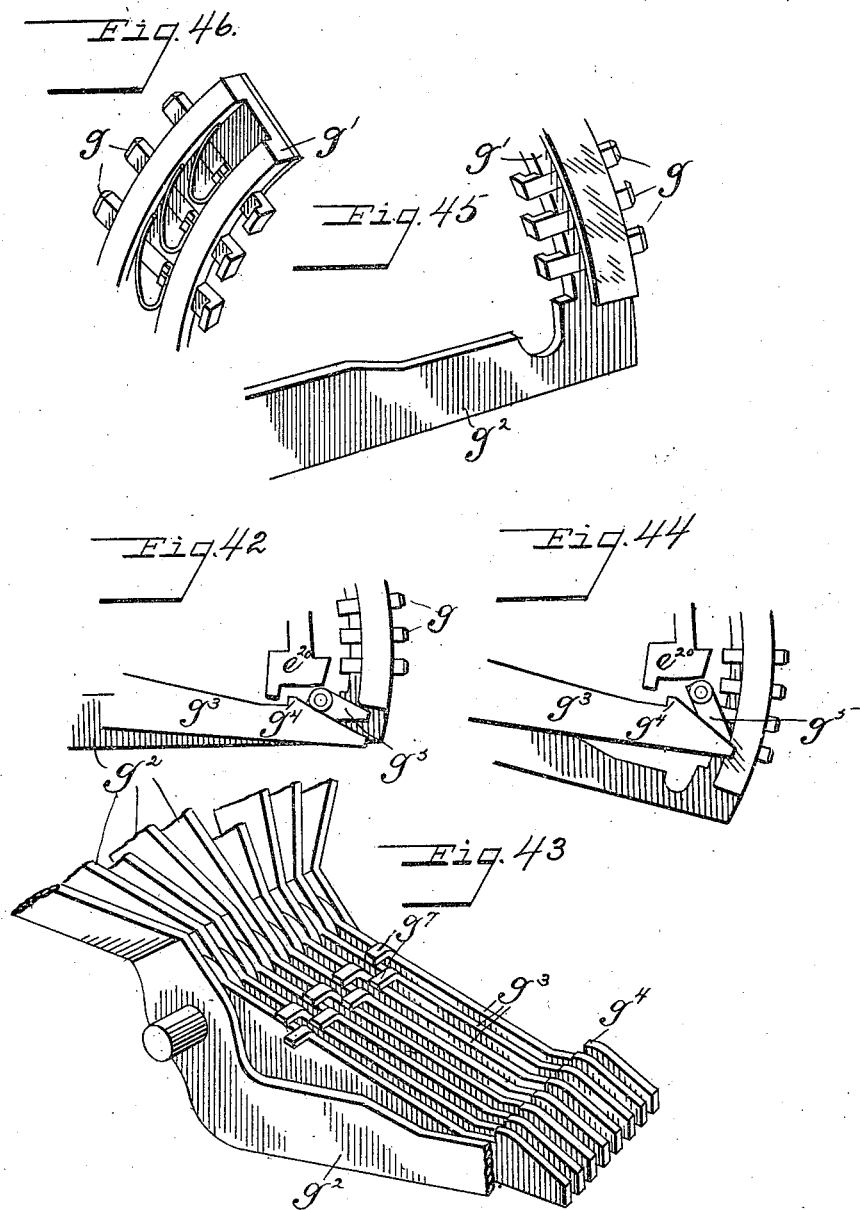

No. 831,633. PATENTED SEPT. 25, 1906.
A. SCHNEIDER & J. PERFLER.
CALCULATING MACHINE.
APPLICATION FILED APR. 30, 1903.
14 SHEETS—SHEET 13.
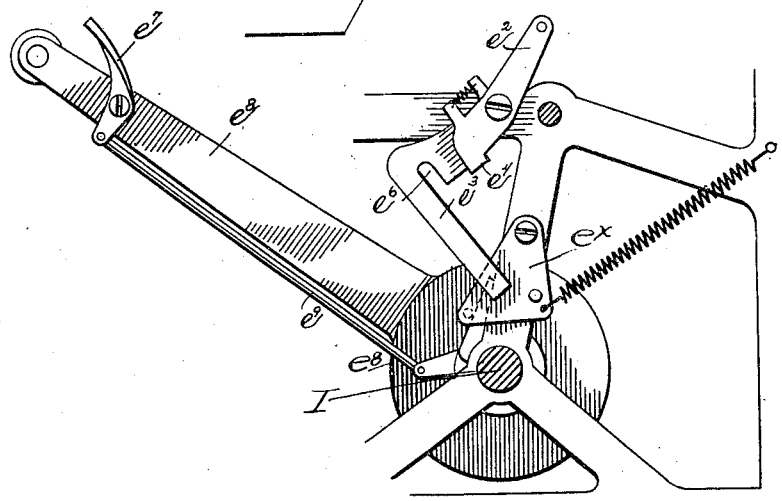
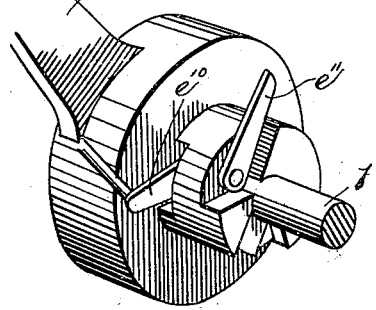
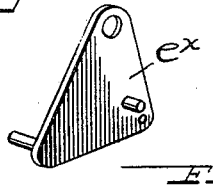
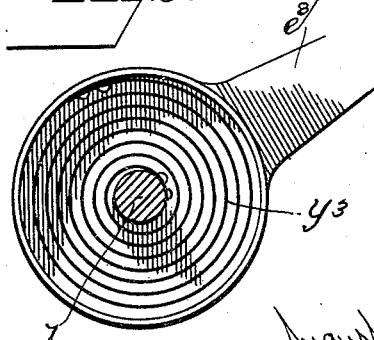
WITNESSES:
INVENTORS
August Schneider
Jos Perfler
BY
ATTORNEYS

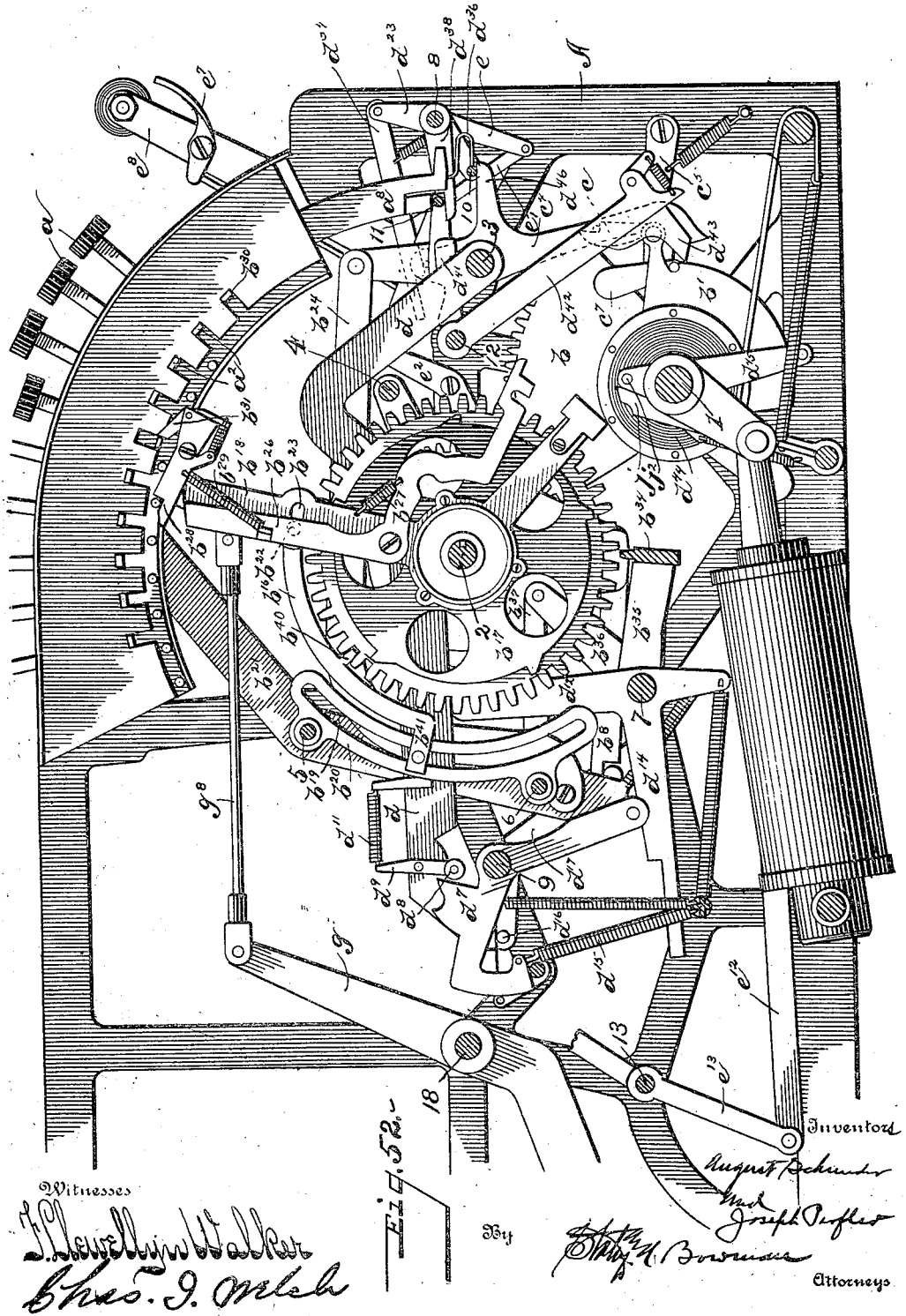

UNITED STATES PATENT OFFICE.

AUGUST SCHNEIDER AND JOSEPH PERFLER, OF COLUMBUS, OHIO, ASSIGNORS OF ONE-HALF TO LEWIS FINK, OF COLUMBUS, OHIO.

CALCULATING-MACHINE.

No. 831,633.      Specification of Letters Patent.      Patented Sept. 25, 1906.

Application filed April 30, 1903. Serial No. 154,917.

*To all whom it may concern:*

Be it known that we, AUGUST SCHNEIDER and JOSEPH PERFLER, citizens of the United States, residing at Columbus, in the county of Franklin and State of Ohio, have invented certain new and useful Improvements in Calculating-Machines, of which the following is a specification.

Our invention relates to improvements in calculating-machines; and our object is to produce a machine which shall be compact, easy to operate, and accurate in its operation.

Our improvements are embodied in a machine which employs a series of banks of keys, which keys are adapted to be depressed for the purpose of setting the machine for adding and printing definite amounts, and our machine is adapted to totalize the amounts and print the total.

We have invented a machine in which the different parts necessary for operating the machine are moved by force applied through the main operating devices, and the keys are used for regulating the movement of the parts operated by the main operating devices. The main operating devices are controlled by means of a crank, and the construction is such that the setting of parts for totalizing is accomplished in large part by force applied to the crank of the machine, and little force is required to be applied through the keys of the machine, which have a trigger-like effect, the force necessary to set and move the parts being applied through the crank. In our machine the printing mechanism coöperates with the actuating mechanism, so as to render the operation more positive and decrease the amount of force necessary to be applied to operate the machine.

In the drawings, Figure 1 is a top plan view of the machine. Fig. 2 is a transverse sectional view on the right side of the machine, taken on the line $x$ $x$ of Fig. 1. Fig. 3 is a transverse sectional view at the left side of the machine, taken on the line $y$ $y$ of Fig. 1. Fig. 3$^a$ is a sectional view of the shaft 2 and its supporting mechanism. Figs. 4 and 5 are detail views of one of the banks of keys and the frame for supporting same. Figs. 6 to 9, inclusive, are detail views of parts connected with the key-bars of our machine. Figs. 10, 17, 18, and 24 are sectional views of the main operating mechanism. Figs. 11 to 16, inclusive, are detail views of parts of same. Figs. 19 to 21, inclusive, are detail views of the shaft for the adding-wheels. Figs. 22 and 23 are detail views of parts of the totalizing mechanism. Figs. 25 to 30, inclusive, are detail views of the transfer mechanism. Fig. 31 is a detail view of the stop mechanism for preventing a partial operation only of the machine. Figs. 32, 33, and 34 are views of the actuating parts for the adding-wheels. Fig. 35 is a transverse sectional view showing the adding-wheel and transfer mechanism in elevation. Fig. 36 is a transverse sectional view of the printing mechanism. Fig. 37 is a detail view of the mechanism for advancing the paper strip. Figs. 38 and 39 are side views of the mechanism for operating the type-ribbon. Figs. 40 to 47, inclusive, are detail views of parts of the printing mechanism. Figs. 48 to 51, inclusive, and 53 are detail views of the operating-crank of the machine. Fig. 52 is a longitudinal sectional view taken through the machine between the adding-wheels on the line $y$ $y$ of Fig. 1 looking to the right thereof, showing the adding-wheels in elevation.

Like parts are represented by similar characters of reference in the several views.

*Frame and shafts.*—The frame of our machine is indicated by the letters A A. The shafts (indicated by the numerals 1, 2, and 3, Fig. 2) extend through the machine and are supported by the side frames. The key-frame for supporting the push-keys is constructed the same as shown in our prior patent, No. 682,755, dated September 17, 1901, to which reference is here made, and we employ a similar rack-bar and lock-bar as shown and described fully in said prior patent. These bars are for locking the push-keys in depressed position and for locking the undepressed keys of one bank in undepressed position after any one key has been depressed. The push-keys $a$ are supported by a keyboard, which is a part of the framework of the machine, and these push-keys are adapted to slide within guides formed in the keyboard, as shown in Figs. 4 and 5.

*Keys and key-bars.*—The push-keys $a$ are known as "value-keys" and consist of a button, Fig. 1, with the proper numeral indicated thereon and a key-stem which extends downwardly, having a pin $a'$ extending from the stem of the key, which coöperates with the lock and rack bars to effect the locking of the keys. A stop $a^2$ on the key-stem determines the extent of movement of the actuating part for the adding-wheel, there being an actuating device for each bank of keys.

$a^3$ indicates the rack-bar, and $a^4$ the teeth on said rack-bar, having shoulders $a^5$. A spring $a^6$ normally holds said rack-bar in proper position to be moved by the push-key.

$a^7$ indicates the lock-bar, and $a^8$ the foot of said bar.

We employ key-springs for holding the keys in their normal position, and the parts thus far described operate in the same manner as those set forth and described in our prior patent, No. 682,755, to which reference has heretofore been made.

*Main operating devices.*—The main operating-shaft (marked 1) is indicated in Fig. 2, and the crank-handle for our machine is connected to said shaft, as shown in Fig. 1. The main sector $b$ is part of the main operating device, and the auxiliary sector $b'$ constitutes part of the auxiliary actuating mechanism for the printing devices. Said main sector $b$ is journaled rigidly to the shaft 1, whereas the auxiliary sector $b'$ is loosely journaled on said shaft and is adapted to be operated directly by the main sector $b$, as hereinafter specified. Each main sector gears with a main operating-wheel $b^2$, Figs. 2 and 3, and the main operating-wheel is composed of the parts indicated in Fig. 24. The main operating-wheel is also part of the main operating device of our machine. The hub $b^3$ is journaled loosely on the shaft 2, and the main wheel $b^2$ is supported on the flange of said hub and is adapted to be moved by the main sector $b$ a limited distance thereon without moving the hub. The wheel $b^2$ is held on said hub $b^3$ by a screw-threaded cap $k^5$, shown in said figure. A spring $b^4$, contained within the hub of said main operating-wheel, has one end attached to the shaft 2, while the other end of said spring is attached to the hub, and consequently whenever the hub is rotated it puts the spring $b^4$ under tension. The shaft 2 is rigidly journaled to the frame of the machine. A pin $b^6$, Figs. 17 and 18, extending from the side of the hub, is adapted to contact with the shoulder $k^3$, formed in the slot $k^2$, which is shown in the flange of the main operating-wheel, so that when the main operating-wheel has been rotated a predetermined distance by its connection with the main sector $b$ said operating-wheel will, upon its further rotation advance the hub with it in the direction of the arrow shown in Fig. 17 and wind up the spring $b^4$, which we shall term the "motor-spring" for the machine. Upon the return movement of the parts the motor-spring $b^4$ will ordinarily return the hub to its normal position; but in order to insure the return of said hub under any and all conditions we have shown a pivoted catch $b^5$, Fig. 17, hereinafter more specifically referred to, which upon the return movement of the hub will connect the hub with the main operating-wheel and return the hub positively to its normal position in the event the motor-spring $b^4$ does not act to return the parts. In this way we attain a limited initial movement of the main operating-wheel before it operates to rotate the hub, which hub is connected with the actuating mechanism for the adding-wheels and other parts of the machine. This is especially desirable for the purpose of setting certain mechanism, as hereinafter explained.

The main operating-wheel rotates independently of the hub $b^3$ until the pin $b^6$ contacts against the shoulder $k^3$, Figs. 17 and 18. Thereafter the parts move together until the pivoted catch $b^5$ is depressed by the contact of the pin $b^{10}$ against the part $b^7$ near the end of the return movement. The pin $b^{50}$, Fig. 17, upon the hub $b^3$ thereupon moves out of the notch formed in the catch $b^5$, (shown clearly in Fig. 17,) and the catch thereafter moves free from the pin, so that the main operating-wheel continues its return movement free and independent of the hub $b^3$. In other words, the main operating-wheel first rotates an initial distance independent of the hub and then continues its rotating movement connected with the hub and near the end of its return movement is disconnected from the hub and continues its return movement independent of the hub. This permits the operating-wheel to have a limited amount of movement at the beginning free and independent of the hub, which is desirable for the purpose of setting parts of the mechanism, and a limited movement at the end of its rotation free and independent from the hub which is desirable for the purpose of insuring the release of the actuating mechanism, as hereinafter explained. The pivoted pawl $b^8$ on the hub $b^3$ is held in normal position by the pin $k'$, Fig. 17, contacting with the tail of said pawl. This pawl is adapted upon the return movement of the sector to engage with a rod for resetting the transfer mechanism, as will be hereinafter described, and at the end of the return movement of the hub the pin $k'$ causes the pawl to be raised out of engagement with said rod, which is adapted to reset the transfer mechanism. We have shown a rod 4, which extends across the machine, said rod being supported by arms $b^{11}$, extending from the hub $b^3$ of said operating-wheel, Fig. 3. Through this rod 4, as hereinafter explained, the hub $b^3$ is adapted to cause the return of the actuating parts to normal position after they have operated the adding-wheels, and the pawl $b^8$ is adapted to cause the return of the transfer mechanism. We have termed the hub $b^3$ and the rod 4 "auxiliary operating mechanism," the wheel $b^2$ being the main operating-wheel, which is directly operated by the sector $b$, which constitutes a part of the main operating mechanism.

There is a main operating-sector and a main operating-wheel on each side of the machine; but there is only one auxiliary sector $b'$, which auxiliary sector is located on the right side of the machine.

*Actuating parts.*—There are actuating parts for each adding-wheel corresponding to each bank of keys, and said actuating parts are normally held against movement, but are adapted to be released by the depression of any key of a particular bank. Said actuating parts are further held against movement by the contact of the rod 4 against their tails, and this rod is moved away from contact whenever the crank of the machine is operated. Consequently the actuating parts are released by the depression of a key and by the movement of the crank, and until both operations are performed the actuating parts cannot actuate the adding-wheels. This rod 4 is adapted upon the return movement of the operating wheel and sector, by contact against the tails of the actuating parts hereinafter specifically described, to restore them to their normal positions.

On the shaft 2 between the respective main operating-wheels $b^2$ we have shown for each denomination represented on the keyboard a bushing $b^{12}$, loosely journaled on said shaft, with bifurcated arms $b^{13}$ extending upwardly, forming an actuating-arm for the adding-wheel, Figs. 33 and 52. An exterior bushing $b^{14}$ is journaled loosely on said first-mentioned bushing and has arms or plates $b^{15}$ extending upwardly, Fig. 33, which are adapted to support the end of the actuating-bar $b^{16}$, which carries the tooth $b^{40}$. (Shown in Figs. 27 and 33.) The loose end $b^{41}$, Fig. 35, of said actuating-bar $b^{16}$ is adapted to move freely within a slot $b^{19}$ of the link $b^{20}$. The link $b^{20}$ is supported on the rods 5 and 6, which extend from the bars $b^{21}$, there being one bar on each side of the machine. Said bars are pivoted on the frame of the machine and with the rods 5 and 6 constitute what may be called the "supporting-frame" for the actuating mechanism. A pin $b^{22}$, Figs. 33 and 35, which holds the actuating-bar $b^{16}$, connected with the arms or plate $b^{15}$, extends through slotted openings $b^{23}$, Fig. 35, formed in the actuating-arms $b^{13}$. This slotted opening permits movement of the actuating-bars independent of the actuating-arms, and the slot is of such length as to permit the actuating-bar to have sufficient independent movement to move the adding-wheel one tooth for transferring purposes, as will be more fully explained hereinafter. Arms $b^{24}$, connected with said main supporting-frame, Fig. 27, extend on each side of the machine in a forward direction (toward the operator) and by reason of the contact of the rear part of said arms, near the pivotal point of same, against the rod 6, extending from said supporting-frame, are adapted to raise said supporting-frame for the purpose hereinafter specified.

The foot of the bifurcated arm $b^{13}$ is formed in the manner shown in Fig. 29. A spring-pressed pawl $b^{14}$ is shown thereon pivoted on the pin connecting the bifurcated arm, and the specific arrangement shown therein is for the purpose of insuring the accurate engagement of the pawl $b^{14}$ with the periphery of the disks, hereinafter mentioned, so as to avoid inaccuracies in the construction. The purpose of the pawl $b^{14}$ is to determine the extent of movement of the actuating part $b^{13}$ during the totalizing operation, as will be explained.

In general the operation of the actuating part registers on its corresponding adding-wheel the amount determined by the key depressed in that particular bank of keys and further coöperates with the printing mechanism to cause said amount to be printed on a tape. The tooth $b^{40}$ on the actuating-bar hereinbefore mentioned is during this operation held in engagement with its corresponding adding-wheel during the forward movement of the main operating mechanism, and upon the return of said mechanism the tooth is raised out of engagement with the adding-wheel by the raising of the supporting-frame hereinbefore mentioned, thereby leaving all the adding-wheels that have been operated in their advanced position. For the purpose of totalizing amounts the actuating-arms may be released from engagement with their corresponding adding-wheels prior to the movement of the actuating-arms by the depression of a key known as the "total-key," (shown in Fig. 1 to the left of the value-keys,) and the tooth of the actuating-bar during the movement of the actuating-arm when totalizing is done will be raised and held out of engagement with its corresponding adding-wheel. The extent of movement of the actuating-arm is determined by the pawl $b^{14}$ in the following manner: Each adding-wheel $b^{17}$ is formed with a disk $b^{18}$. The adding-wheels are shown herein with fifty teeth on the periphery thereof and five teeth on the disk. In normal position when the adding-wheels are all at zero and before the operation of any actuating-arm the pawl $b^{14}$ will contact with one of said five teeth on the periphery of said disk, but after the adding-wheels have been advanced by an actuating-arm the teeth on the periphery of the disk will move away from contact with said pawl $b^{14}$, so that when totalizing is done the actuating-arm for each adding-wheel will be permitted to move through the agency of the actuating-spring hereinbefore referred to until said pawl contacts with the tooth nearest it on the periphery of the disk. Each actuating-arm $b^{13}$ has a spring $b^{25}$, which may be termed the "actuating-spring," and it is wound up during the construction of the machine, one end of said spring being connected to the shaft 2 and the other end to the bushing of said actuating-arm, Fig. 34. The function of this spring is to operate the actuating-arms as soon as same are released during the registering operation, as well as the totalizing operation, the only difference being that during the registering operation said spring will also operate the registering-wheel through the engagement of the tooth $b^{40}$ with the teeth of the registering-wheel, whereas during the totalizing operation the actuating-arm will be advanced without operating the registering-wheel. The supplementary arm $b^{26}$ normally contacts with and is held in normal position by the rod 4. A spring $b^{27}$ tends to draw the lower end of said supplementary arm $b^{26}$ forward, Fig. 34, and the upper end of said arm rearward whenever said rod 4 is raised out of contact with the lower end of said supplementary arm. The function of the supplementary arm is to hold or lock the actuating-arm until the crank of the machine is operated, the rod 4 being directly connected to the hub $b^3$, which hub is operated by the sector $b$ through the agency of the crank. Consequently the actuating-arms may all be released, but same cannot move until the rod 4 is moved away from contact with the tail of the supplementary arm $b^{26}$. A pawl $b^{28}$, pivoted on the actuating-arm $b^{13}$, is normally held with its rear end in depressed position by a spring $b^{29}$, Fig. 34, and this pawl $b^{28}$ is adapted to contact against the stop $b^{30}$, which is in line with the lug $b^{31}$, extending upwardly from said pawl. Consequently the actuating-arm is held against operation by the actuating-spring on account of the stop $b^{30}$, normally contacting against the lug $b^{31}$. When, however, the stop $b^{30}$ is raised, the actuating-arm will be unlocked, but it still cannot be advanced by the actuating-spring until the rod 4 is raised through the agency of the crank or handle of the machine. The actuating-arm after a key is depressed and the crank operated will then move until the projecting lug $b^{31}$, Fig. 34, contacts against a stop formed on the stem of the key, which stop is then thrown into the path of movement of the lug by the depression of the key. The actuating-arm will be advanced by the actuating-spring, which spring is rewound by the motor-spring hereinbefore referred to. This rewinding is effected by the rod 4, contacting against the tail of the actuating-arm, and when the rod 4 is returned to normal position by the main motor-springs the actuating-arm will be returned to normal position and the actuating-spring wound up.

*Locking devices.*—In addition to the locking devices for the actuating-arms hereinbefore referred to there are locking devices shown herein which are necessary to insure accuracy during the totalizing operation. During the totalizing operation no one of the value-keys can be thrown into depressed position. Consequently the actuating-arms will be free to move an unlimited distance, excepting for the following means: A locking-bar $b^{34}$, Fig. 3, is adapted to be thrown into engaging position with the teeth of the adding-wheels at the beginning of each totalizing operation. The actuating-arms will therefore be advanced by the actuating-spring until the pawl $b^{14}$ contacts against one of the five teeth on the periphery of the disk connected with the adding-wheel, and through the agency of this bar $b^{34}$, which holds the adding-wheel against movement, the actuating-arms will be held against further movement; but the adding-wheels must be released from said locking-bar at the beginning of the return movement of the actuating-arms, for so soon as the bar $b^{34}$ is thrown out of engagement with the adding-wheels the actuating-arms would be free to move the adding-wheels an additional distance, and thus destroy the accuracy of the totalizing operation, excepting for the following mechanism: The supplementary arm $b^{26}$ having been released from contact with the rod 4 will move with the actuating-arm $b^{13}$. The actuating-spring $b^{25}$ is of stronger tension than the spring $b^{27}$, Fig. 34, so that the actuating-arm and supplementary arm will retain the relative position shown in Fig. 34 until the actuating-arm $b^{13}$ is released by the pawl $b^{14}$ contacting against one of the teeth on the adding-wheel. The spring $b^{27}$ will then move the supplementary arm $b^{26}$ independent of the movement of the actuating-arm into a position forward of the actuating-arm, and the pawl $b^{24}$ will thereby be released from tension of the spring $b^{29}$, and the pawl being weighted at the rear will be raised until the shoulder of said pawl contacts with one of the pins on said key-frame. The lock-bar $b^{34}$ will then be withdrawn from engagement with the adding-wheels; but the actuating-arms will be locked by the engagement of the pawl $b^{28}$, as just explained. The parts will be held locked until the rod 4 upon its return movement depresses the tail of the supplementary arm $b^{24}$ and moves the upper end of said arm to the position shown in Fig. 34, when the spring $b^{29}$ will be put under tension and depress the rear end of said pawl out of position to engage the teeth, and the rod 4 will then move the actuating-arm back to normal position.

The shaft 2 is slotted at its end, as shown in Fig. 21, and a ratchet $b^{32}$ is formed with a key which extends into the slot of said shaft, and by means of the connection shown in Figs. 19 and 20 the shaft and actuating-springs are wound up through the ratchet $b^{32}$ and held locked by the pawl $b^{33}$. The locking-bar $b^{34}$ is supported by arms $b^{35}$ on the rear side of the machine, which arms are journaled loosely on the shaft 7. An arm $b^{36}$, Fig. 3, is also journaled loosely on said shaft 7 and is connected by the link $b^{37}$ to the rod 6, extending from the side arm $b^{21}$. The arms $b^{35}$ and $b^{36}$ are held connected by a spring $b^{38}$, so that said locking-bar may be adjusted for any inaccuracies in the construction. It will be seen that whenever the side arms are raised for the purpose of throwing the tooth of any actuating-bar out of engagement the adding-wheels will all be locked by said locking-bar $b^{34}$.

*Returning mechanism for actuating-arms.*— For the purpose of disengaging the teeth $b^{40}$ of the actuating-bar from its corresponding adding-wheel, so that the actuating-arms may be returned to normal position without returning the adding-wheels, but, on the contrary, leaving them in their advanced position, we have shown the auxiliary sector $b'$ formed with a pivoted pawl $c$, Figs. 2, 11, and 15. During the rearward movement of the actuating-arm when the adding-wheels are advanced for registering purposes the auxiliary sector $b'$ is held connected with the main sector $b$ and moves therewith. The pawl $c$ is pivoted on a pin $c'$, which pin extends through the bifurcated arms of the auxiliary sector. The bifurcation is such that the tail of the pawl is normally held against the auxiliary sector by the tension of a spring $c^2$, and the arrangement is such that the pawl in the rearward movement of the auxiliary sector contacts against the pin $c^3$, formed on a crank-arm $c^4$, and is free to move past said pin $c^3$ against the tension of the spring $c^2$, Figs. 12 and 15;) but at the beginning of the return movement of said auxiliary sector the tail of the pawl contacts against the auxiliary sector and the pawl forces the lower end of the crank-arm $c^4$ outwardly until it is caught and held by the spring-pressed catch $c^5$. The crank-arm $c^4$ is connected with the supporting-frame for the actuating-bar, hereinbefore described, by the curved bar $b^{24}$, Fig. 2. The result of this construction is that the supporting-frame at the beginning of the return movement of the auxiliary sector $b'$ is raised, and thereby the teeth on the actuating-bars are disengaged from the adding-wheels and the same are held disengaged by the catch $c^5$ engaging and holding the crank-arm $c^4$, as hereinbefore described. The movement of the actuating-arms back to normal position will therefore be made when the teeth on the respective actuating-bars are out of engagement with the adding-wheels. Consequently the actuating-bars will be returned to normal position, leaving the adding-wheels in their advanced position. The catch $c^5$ is thrown upwardly in order to release the crank-arm $c^4$ and permit the supporting-frame to drop back to normal position at the end of the return movement of the auxiliary sector $b'$. This is effected by a lug $c^6$, Fig. 10, on the main sector $b$ contacting with the end of said catch $c^5$ and raising it out of engagement with the pin on said crank-arm $c^4$. This is effected at the end of the return movement of the main sector $b$ and auxiliary sector $b'$.

The auxiliary sector and the main sector are held connected by a double-arm link $c^7$, pivoted to the main sector $b$ and held in normal position by the spring shown in Fig. 10; but this link is adapted to be raised at certain times, so that the pin $c^8$, Fig. 14, is disengaged from the groove formed in the auxiliary sector $b'$, Fig. 10. So long as the pin $c^8$ rests within the groove the main sector and auxiliary sector will be held connected; but when the double-arm link $c^7$ is operated the pin $c^8$ will be raised temporarily from the groove and the main sector may then move without transmitting motion to the auxiliary sector. During this operation the pin will, during the movement of the main sector $b$, travel upon the periphery of the auxiliary sector. This disconnection of the main sector and auxiliary sector is effected when the machine is to be operated for clearing purposes, a time when the actuating-arm shall be returned while operating the adding-wheels, and it is therefore necessary that the actuating-bar be dropped to engage the respective teeth with the adding-wheels at the beginning of the return movement of the actuating-arm. This is effected by the following mechanism: The pin $c^8$ will, at the end of the rearward movement of the sector $b$ when the auxiliary sector is disconnected therefrom, rise over the head of the spring-pressed catch $c^9$, pivoted to the auxiliary sector $b'$, so as to operate said catch at the beginning of the return movement of said sector, and the pivoted catch when moved will raise the catch $c^5$ out of engagement with the crank-arm $c^4$, thereby permitting the supporting-frame $b^{21}$ to drop until the teeth on the actuating-bars engage the corresponding adding-wheels, so that upon the further return movement of the main sector the adding-wheels will be moved with the actuating-arms back to normal position, which will result in restoring all the adding-wheels to zero position. (See Figs. 11 and 15.) It will thus be seen that the pin $c^8$ will normally be locked within the groove of the auxiliary sector $b'$, and thereby hold the auxiliary sector and main sector connected; but when the pin $c^8$ is raised out of the groove it will accomplish the result of throwing the spring-pressed catch $c^9$ at the beginning of the return movement of the main sector, and thereby release the catch $c^5$ from engagement with the crank-arm $c^4$ and effect the engagement of the actuating-arm with the corresponding adding-wheel. This movement of the double arm $c^7$ is effected by the parts connected with the pawl on the crank-arm of the machine, which will be explained in detail later.

*Transfer mechanism.*—The parts of the transfer mechanism consist of a transfer-bar $d$, formed with a slotted opening $d'$ near the center thereof. Said transfer-bar $d$ is pivoted on a rod 3, which extends across the machine and is journaled loosely in the frame. An arm $d^2$ is pivoted on an extension of the actuating-arm $b^{13}$, Fig. 30, and said arm has a slot at its end of peculiar form. The slot is shown in Fig. 25 concentric at both ends, the center of both curves being the pivot of the arm, but of different radii, the two ends being connected by an inclined portion $d^3$. The pin $d^4$, extending from the plate $b^{15}$, which plate is connected with the actuating-bar, as hereinbefore explained, locks said tooth $b^{40}$ in engagement with the adding-wheel by means of the peculiar form of the slot. A pin $d^5$, formed on said pivoted arm $d^2$, extends within a vertical slot $d^6$, formed in the actuating-arm $b^{13}$, and thereby provides for a limited movement of said pivoted arm for transferring purposes. Said pin $d^5$ also extends within the slot $d'$, formed in the transfer-bar $d$. Said transfer-bar $d$ is normally held in the position shown in Fig. 35; but whenever the adding-wheel of the next lower denomination is moved ten teeth said transfer-bar is caused to drop, partly by its own weight and partly by the tension of the spring $d^{47}$, connected to the rod $d^{48}$, which rod extends across the frame of the machine, and thereby the pin in the slot $d'$ is forced downwardly, which in turn draws the pivoted arm $d^2$ downwardly, and the pin $d^4$ thereupon moves from the lower portion of the slot in the arm $d^2$ along the inclined surface $d^3$, which movement on the inclined surface forces the plate $b^{15}$, Fig. 33, rearwardly and advances the actuating-bar and its tooth until the pin $b^{22}$ contacts against the other end of the slot $b^{23}$, formed in said actuating-arm. Thereby the adding-wheel is advanced a distance equal to one tooth of said wheel and is held in advanced position by a spring-pressed crank-arm $d^7$ through the agency of the roller $d^8$ on the arm $d^9$ resting upon the curved surface of the projecting part $d^{10}$. Said roller $d^8$ is normally held in proper position to rest upon said curved surface by a spring $d^{11}$. A crank-arm $d^{12}$ is operated by projections or teeth $d^{46}$, Fig. 34, projecting from the disk of the adding-wheel, there being five of said projections or teeth, as hereinbefore explained. When the upper end of said crank-arm $d^{12}$ is moved by a tooth on the disk of the next lower adding-wheel contacting against the beveled end $d^{13}$ of said crank-arm $d^{12}$, the lower arm $d^{14}$ of said crank-arm $d^{12}$, forming a latch for the lower arm of the crank-arm $d^7$, is withdrawn from engagement therewith, and the spring $d^{15}$ operates said crank-arm $d^7$, thereby causing the roller on the arm $d^9$ to drop away from the curved surface $d^{10}$, which causes the transfer-bar $d$ to drop for the purpose of causing the transfer from one wheel to the next higher wheel, as just previously explained. The transfer-bars $d$ are returned to normal position by the rod $d^{16}$, which is supported by the bifurcated spring-pressed arms $d^{17}$, having the pin $d^{18}$, adapted to be engaged by the pivoted operating-pawl $b^8$, formed on the hub $b^3$, Figs. 2 and 35, and, as shown in Fig. 3, the pivoted operating-pawl $b^8$ drops into engagement with the pin $d^{18}$ at the end of the rearward movement of the operating-wheel, and the pawl $b^8$ by contact against the pin $d^{18}$ at the beginning of the return movement of the main operating-wheel raises the rod $d^{16}$ upwardly, said rod extending across the machine and partly below the transfer-bars $d$, thereby raising all transfer-bars which have dropped to normal position, when the roller $d^8$ will be engaged by the crank-arm $d^7$, which crank-arm will have been prior thereto returned to proper position by said rod $d^{16}$ contacting against the upper part of the crank-arm $d^7$ and forcing same back to normal position.

The surface $d^{10}$ is curved, as shown in Fig. 35, and is formed concentric with the center of the shaft 9. The arrangement is one which results in a quick and positive dropping of the transfer-bar for the purpose of insuring an accurate transfer from one wheel to the next succeeding wheel.

We have shown transfer mechanism in two different views. In Fig. 35 the parts are in normal position before any transfer is made. In Fig. 52 we have shown the transfer mechanism just after the transfer has been made and before the parts are returned to normal position. It will be perceived that in Fig. 35 the transfer-bar $d$ is shown in its upper or normal position and held there by the spring-pressed crank-arm $d^7$, so that the roller $d^8$ engages the curved surface of the projecting part $d^{10}$, whereas in Fig. 52 the transfer-bar $d$ is shown in its lower position with the roller $d^8$ out of engagement with the curved surface of the projecting part $d^{10}$ and dropped below said surface. In Fig. 35 we have shown the crank-arm $d^{12}$ in such position that the lower arm $d^{14}$ has a shoulder formed thereon in engagement with the pin on the lower end of the crank-arm $d^7$ and ready to operate said crank-arm whenever the upper end of the crank-arm $d^{12}$ is moved by the contact of the tooth on the disk of the adding-wheel with the pin $d^{13}$. This will occur whenever the adding-wheel makes one-fifth of a revolution. In Fig. 52 we have shown the lower arm $d^{14}$ of the crank-arm $d^{12}$ with the shoulder out of engagement with the pin formed on the crank-arm $d^7$, and the arm $d^{14}$ has moved the crank-arm $d^7$ so as to throw the roller $d^8$ off of the curved surface of the projecting part $d^{10}$, causing the transfer-bar $d$ to drop, so that the roller $d^8$ is shown below the curved surface of the part $d^{10}$. In Fig. 35 we have shown the rod $d^{12}$ out of position for engagement with the ends of the transfer-bars, and it will be noticed that the rod is shown some distance below the ends of said bars $d$; but in Fig. 52 we have shown the transfer-bars dropped, so that their ends rest upon the rods $d^{16}$. Consequently whenever the rod $d^{16}$ is raised from the position shown in Fig. 52 the transfer-bars $d$ will be raised. The rods $d^{16}$ will be raised when the pivoted operating-pawl $d^8$, formed on the hub of the operating-wheel, drops into engagement with the pin $d^{18}$, which will occur at the end of the forward movement of the main operating-wheel. At the beginning of the return movement thereof the transfer-bars $d$ will be raised until the rollers $d^8$ are held and supported by the curved surface of the projecting part $d^{10}$.

*Total-key and its connections with value-keys.*—The total-key $a^x$, Fig. 3, is connected by the link $d^{19}$ to a crank-arm $d^{20}$, formed rigid with the sleeve pivoted on the shaft 8, which sleeve is pivotally connected with the slotted end of a link $d^{21}$, and said link $d^{21}$ is adapted to raise and lower the catch $d^{22}$, pivoted to one part of the arm $d^{23}$. The arm $b^{24}$ at the left side of the machine is pivotally connected to an arm $d^{23}$, pivoted on the shaft 3, and there is also pivoted on the shaft a supplementary arm $d^{24}$, having a pin thereon $d^{25}$, which is adapted to be engaged by a pawl $d^{26}$, extending from the arm $d^{27}$, formed integral with the main sector $b$. There is also formed on said supplementary arm $d^{24}$ a pin $d^{28}$, such that when the total-key is depressed and the lower end of the catch $d^{22}$ raised and held in position to be engaged by the pin $d^{28}$, Fig. 23, the movement of the sector through the agency of the pawl $d^{26}$ will operate the crank-arm $d^{23}$. So soon as the pin $d^{28}$ is forced within said slotted opening any further movement of the arm $d^{24}$ will cause the arm $d^{23}$ to move in unison therewith, for the reason that the arm $d^{22}$, as already explained, is pivoted on the lower end of the crank-arm $d^{23}$. In other words, the arm $d^{22}$ when raised by the depression of the total-key $a^x$ forms a lock for the arm $d^{24}$, which prevents said arm $d^{24}$ from being caused to move independent of the arm $d^{23}$, and the pawl $d^{26}$ acting on the arm $d^{24}$ operates the arm $d^{23}$, thereafter and thereby raising the supporting-frame through the contact of the arm $b^{24}$ with the rod 6. The plate $d^{29}$ is pivoted to the side frame, and the lower end of said plate is engaged by a pin $d^{19}$, Fig. 18, extending from the main operating-wheel. During the preliminary initial movement of the main operating-wheel the upper end of the plate $d^{29}$ will be moved so as to lock the total-key either in depressed or undepressed position, and said plate is held in locked position by a spring $d^{30}$. The total-key will be held locked until the end of the return movement of the operating-wheel, when the pin on said wheel contacting against the lower end of said plate $d^{29}$ will throw the upper end of said plate out of engagement with the pin $d^{31}$, shown on the shank of said key, Fig. 3. The upper end of the link $d^{21}$ is slotted, for the reason that when the total-key is depressed and held in depressed position and the crank arm $d^{23}$ thereafter oscillated about its pivot 3, the link $d^{21}$ will move up and down idly by reason of its slotted portion.

The lower end of the arm $d^{23}$ has a head $d^{32}$ formed thereon, which normally rests in contact with a rod marked 10, which rod extends across the frame and is supported by crank-arms $d^{33}$, pivoted on the shaft 8, which shaft also extends across the frame, and the ends of same are journaled loosely in the sides of the frame of the machine. On the upper arm of the crank-arm $d^{33}$ is a pivoted latch $d^{34}$, normally spring-pressed into latching position by means of a spring $d^{35}$. There is a latch $d^{34}$ on each side of the machine, and these latches are for holding the value-keys locked until the end of the operation of the machine. The construction, as hereinafter explained, is such that at the end of the complete operation of the machine these latches are raised out of latching position. Whenever the total-key is depressed and held depressed, so that the sector $b$ will cause the lower end of the arm $d^{23}$ to be raised, the head $d^{42}$ will raise the rod 10, which in turn will raise the lock-bars $a^7$ by the agency of springs $d^{36}$, which contact against the foot $a^8$ of said locking-bars $a^7$, Fig. 5, which operates arm $a^y$, thereby raising stop $b^{30}$. (See Fig. 53.) By adjusting these springs we are enabled to adjust for inaccuracies of construction. This construction is for the purpose of unlocking the actuating-arms by the depression of the total-key at the beginning of the movement of the sector $b$. Consequently whenever the total-key is depressed any depressed value-key will be released, and the banks of undepressed value-keys will then all be locked by the raising of said lock-bar through engagement with the rod 10, and the same will be held locked by said latches $d^{34}$ engaging the pins $d^{37}$ (see Figs. 2, 5, and 10) on the sides of the frame A. In this way there is avoided any possibility of destroying the accuracy of the machine by the carelessness of the operator in operating any value-keys after the total-key has been depressed and the sector $b$ begun to operate. The release of the latches $d^{34}$ is effected by the following mechanism: Rigidly fixed on the rod 8 near the center of the machine is a lifter-bar $d^{38}$. The rear end of said lifter-bar rests under the rod 11, which rod extends across the machine supported by arms $d^{39}$, which are pivoted loosely on the rod 12. This rod extends across the machine and is journaled loosely in bearings in the frame of the machine. A supporting-arm $d^{41}$, extending in a forward direction on the side of the arm $d^{39}$, is connected rigidly to the rod 12, Fig. 52, by the hub or sleeve $d^{40}$. The arm $d^{41}$ has a projecting piece extending under the arm $d^{39}$ and is adapted to raise said arm and rod 11 supported thereby whenever the rod 12 is rotated. (See Fig. 7.) An arm $d^{49}$, Fig. 3, extending from said rod 12, contacts against the latches $d^{34}$ and raises the same so as to unlock them from the pins $d^{37}$, one of said arms $d^{49}$ being placed on each side of the machine, so that each latch $d^{34}$ will be released by the rotation of the shaft 12. A downwardly-extending foot $d^{42}$, Fig. 5, is journaled rigid with the rod 12. Said foot supports a stop-plate $d^{43}$ pivoted thereon, which is normally spring-pressed against an arm extending from the main shaft 1. When the main sectors operate, the spring $d^{44}$ is wound up and the arm $d^{45}$ presses against the stop-plate, which is forced downwardly against the tension of its spring until said arm passes the forward end of said plate, and the plate thereupon drops back into the path of movement of said arm, and on the return movement of the operating-shaft 1 the arm $d^{45}$ contacts against the stop-plate and forces the foot forwardly, which movement results in raising the rod 11, which in turn raises the rack-bars $a^3$ and also latches $d^{34}$. The rod 11 can also be raised by the total-key and the rack-bar operated to release any and all depressed keys through the connections with the lifter-bar $d^{38}$, as shown in Figs. 5, 7, and 3. As a result of this construction any and all depressed value-keys are released and thrown into operative position by the depression of the total-key and at the beginning of the movement of the sector $b$, and same are held locked during the movement of said sector $b$ until near the end of the operation of the machine. During the ordinary adding operation the value-keys are locked by the agency of the part $c^4$, which has the projecting part $d^{46}$ in engagement with the rod 10.

*Setting parts for clearing machine.*—In order to clear the machine, which means to restore all the adding-wheels to zero or normal position, it is necessary to depress the total-key. For totalizing, this total-key must also be depressed and in addition a pawl on the crank of the machine; but for clearing the machine the total-key alone is depressed without operating said pawl, which will be explained hereinafter. When the total-key is depressed, the shaft 8 is rotated, thereby moving the arm $e$ on the right side of the machine, which is rigidly connected with said shaft 8, Fig. 2. The lower end of said arm $e$ is pivotally connected with the curved bar $e'$, which operates the stop-arm $e^2$. Said stop-arm has the stop $e^3$ pivoted thereon and normally spring-pressed against a lug $e^4$, extending from the side of said arm $e^2$. The result of this construction is that the stop $e^3$ is pressed downwardly until the pin $e^5$ on the double arm $c^7$, heretofore referred to, slides within the slot $e^6$ in said stop, Fig. 10. When the main sector is thereafter moved by the crank of the machine, the double arm $c^7$ is oscillated on its pivot by reason of the contact of the pin $e^5$ engaging in the slotted opening $e^6$ when the stop $e^3$ is depressed, as hereinafter explained, until the pin on said double arm, which normally connects the main and auxiliary sectors, is raised from the groove in said auxiliary sector long enough to free it from the shoulder formed thereon, and the pin thereafter moves on the periphery of the auxiliary sector $b'$, whereby the main sector operates free and independent of the movement of the auxiliary sector. As hereinbefore explained, the depression of the total-key also sets the parts at the left of the machine, so that the supporting-frame is raised by the sector $b$ at the beginning of its movement, which in turn oscillates the crank-arm $c^4$ until it is engaged and held by the catch $c^5$, which catch holds the supporting-frame in raised position and holds the actuating parts free from the adding-wheels. The actuating-arms for the adding-wheels during the setting of the parts for the clearing operation are also released by the movement of the crank-arm $c^4$. The shoulder $d^{46}$, formed on said arm $c^4$, when said crank-arm is oscillated by reason of its connection with the rod $b^{24}$ contacts against the rod 10 and raises it, which in turn causes the lock-bars of the machine to be raised, which move the stops $b^{30}$ out of the path of the movement of the actuating-arms by means of the lever marked 35 in our former patent and fully described therein. Thereby the actuating-arms are free to be moved by the main sector, and during the rearward movement of same the actuating-bars and teeth are out of engagement with the adding-wheels. At the end of the rearward movement of the main sector $b$ the pin on the lower end of said double arm $c^7$ passes over the pivoted latch $c^9$ and thereafter at the beginning of the return movement of the sector releases the supporting-frame, so that the teeth on the actuating-bars all engage the adding-wheels, and thereby the adding-wheels are returned to normal position by the return movement of the actuating-arm, which results in clearing the machine.

*Totalizing.*—When the totalizing is done, the total-key is depressed and also the catch $e^7$, pivoted on a crank $e^8$, Fig. 48, of the shaft 1, which operates a connecting-rod $e^9$, which operates a double-arm-piece $e^{10}$ and throws the arm $e^{11}$, Fig. 49, of same into contact with a pin extending from the side of a spring-pressed pivoted plate $e^x$, Figs. 48 and 50, which raises said plates so as to engage and hold the stop-plate $e^3$. This prevents the dropping of said stop-plate into engagement with the pin $e^5$, as shown in Fig. 10, so that the main sector and auxiliary sectors are held connected and move together during the operation of totalizing. (See Fig. 48.) The printing mechanism is connected with said auxiliary sector $b'$. The spring $y^3$, Fig. 51, operates to return the crank $e^8$ to normal position after it is released by the operator.

*Printing mechanism.*—The auxiliary sector operates the printing-hammers so that no printing or totalizing will be done unless the auxiliary sector is held connected with the main sector. The rod $e^{12}$ is pivoted to the lower part of the auxiliary sector, Fig. 2, and extends rearwardly near the bottom of the machine and is pivoted to an arm $e^{13}$, which is rigidly connected with the shaft 13, journaled loosely in the frame of the machine. From the shaft 13 there extends upwardly an arm $e^{14}$, which is pivoted at its upper end to a forwardly-extending pawl $e^{15}$. (See Figs. 38 and 39.) This pawl is held in an upward position by a spring $e^{16}$ and normally engages the lower end of a crank-arm $e^{17}$, which is spring-pressed by a spring $e^{18}$, attached at one end to the crank-arm $e^{17}$ and at the other end to the bar $f^5$, Fig. 38. The crank-arm $e^{17}$ is rigidly supported on the shaft 14, which shaft is supported by the frame B for the printing mechanism. The frame for the printing-hammer is indicated by $e^{19}$ and is rigidly connected to the shaft 14 and moves therewith, Fig. 41. Type-hammers $e^{20}$ are pivoted on the shaft 14 and connected with the frame $e^{19}$ by springs $e^{21}$. Whenever the crank-arms $e^{17}$ are moved by the pawls $e^{15}$, so that the shaft 14 is rotated, the arms $e^{22}$ of the frame $e^{19}$ are moved upwardly and raise the printing-hammers by means of the connection with the springs $e^{21}$. After said printing-hammers have been raised a predetermined distance the end of the pawl $e^{15}$ passes the foot of the crank-arm $e^{17}$ and releases said crank-arm, so that by means of the spring $e^{18}$ and the weight of the frame the frame and type-hammers are allowed to drop, constituting the actuating-hammers for the type. The printing-ribbon is wound upon reels $f$, having ratchet-wheels $f'$ at the rear ends thereof. These reels carrying the ribbons are moved by the following parts: The arm $e^{14}$, Fig. 38, extending upwardly from the shaft 13, carries near its center a curved bar $f^2$, which is connected at its rear end to an arm $f^3$, pivoted on a shaft 15, supported by the frame of the machine. On this shaft there is also pivoted a crank-arm $f^4$. The lower end of said crank-arm is connected to a sliding bar $f^5$. The upper end of said crank-arm has notches $f^6$, which engage with a spring-pressed pawl $f^7$ on said pivoted bar $f^3$. This pawl connection permits an adjustment of the crank-arm $f^4$ for the purpose hereinafter explained. The sliding bar $f^5$ is slotted near its upper end, and a pin $f^8$, extending from the frame-bars B of the machine, fits within the slot. To the ends of said bar $f^5$ are pivoted actuating-pawls $f^9$, which are held in actuating position by springs. A pin $f^{10}$ just above the slotted portion of said bar $f^5$ engages a plate $f^{11}$, which is also pivoted to one of the frame-bars B. The rear end of said bar $f^{11}$ is formed with a small stop extending upwardly, which lies between the lower end of a stop-pawl $f^{12}$ and a connecting-rod $f^{13}$. The stop-pawl $f^{12}$ is pivoted to the frame B, and the connecting-bar $f^{13}$ is also pivoted to the frame B. The lower end of said bar $f^{13}$ engages the end of a stop-pawl $f^{14}$. Springs normally press the stop-pawls into engagement with the ratchets. As shown in Fig. 39, the crank-arm is so adjusted that the plate $f^{11}$ allows the spring $f^{16}$ to hold the stop-pawl $f^{12}$ in operative position with the upper ratchet-wheel, whereas through its connection with the rod $f^{13}$ said bar $f^{11}$ presses and holds out of operative position the lower stop-pawl $f^{14}$. The connecting-bar $f^5$ has been set so that the upper actuating-pawl $f^9$ is in operative position. The result is that the parts are adjusted for winding the upper roll, and thereby carrying the ribbon from the lower roll to the upper roll. In Fig. 38 the arrangement of parts is reversed, so that the lower roll is adapted to be operated by the lower actuating-pawl $f^9$, and thereby move the ribbon from the upper roll to the lower.

When the shaft 13 is rotated by its connection with the auxiliary sector heretofore described, the crank-arm $f^4$ is moved by reason of its connection with the rod 13 through the curved bar $f^2$ and its connections, which causes the actuating-pawl $f^9$ to move the ratchet one tooth. When the lower roll is operated, the pin $f^{10}$ will cause the pivoted bar $f^{11}$ to hold the stop-pawl $f^{12}$ out of engagement with the upper ratchet, whereas the lower stop-pawl will be held by the spring in operative position for arresting the roll against reverse movement.

The type $g$, Fig. 42, are movable and are held within the frames $g'$. They are normally spring-pressed in downward position, as shown in Fig. 46. The frames $g'$, Fig. 36, are formed integral with the printing-segments $g^2$. There are frames and segments for each bank of keys. These segments are pivoted on the shaft 18, journaled in the frame. The rods $g^8$ connect the printing-segments with the actuating-arms $b^{13}$. Stop-arms $g^3$ are pivoted on the shaft 18, and the ends of these arms have shoulders $g^4$, which normally stand in the path of the printing-hammers and prevent the hammers from striking the type, as shown in Fig. 42. Whenever the printing-segments are operated, the pivoted lug $g^5$ is thrown down against the stop-arm, which moves out of the path of the hammer against the tension of the spring $g^6$, so as to permit the printing. Each stop-arm is connected by shoulders $g^7$ with the next higher stop-arm and moves therewith. In normal position the frames have the zero type in position to be operated by the hammers, and the frames move in unison with the actuating-arms, so that the type corresponding with the key depressed is brought into proper position to be operated by the type-hammer. By reason of the shoulder $g^7$ when any one hammer stop-arm is moved all stop-arms to the left of it will be moved, so as to permit the hammers to strike the zero type.

*Feeding mechanism for paper.*—The paper $h^2$ is rolled upon rolls $h$, Fig. 36, and the end is placed underneath a roll $h'$ and around same and is fed between the rolls $h'$ and $h^4$. Said roll $h^4$ is supported on a pivoted frame $h^5$, which is locked to the frame B by a latch $h^6$. The roll $h'$ has a ratchet-wheel $h^3$ at the left side, and a pawl $h^7$ engages the teeth of said ratchet. The pawl is pivoted on the upper arm of the trip-lever $h^8$ and is held in operative position by a spring $h^9$, Fig. 40. The lower arm of said trip-lever has a pin $h^{10}$, Fig. 40, projecting therefrom. Said trip-lever is pivoted to the frame, and said pin, together with the upwardly-projecting arm $h^{11}$, forms a stop, limiting the movement of said pawl, so that it advances the ratchets of the roll $h'$ one tooth; but when the arm $h^{11}$ is thrown out of the path of said pin $h^{10}$ the roll will be advanced an additional distance, making the movement equal to two teeth. Said arm $h^{11}$ is rigid with the shaft 16, Fig. 40, and an arm $h^{12}$, also rigid with the shaft, has a pin $h^{13}$ fitting within the slotted end of a connecting-rod $h^{14}$, Fig. 3, pivoted to the arm $b^{21}$ of the supporting-frame on the left side of the machine. A spring $h^{15}$ is adapted to press the arm $h^{11}$ past the pin $h^{10}$ whenever the supporting-frame is raised, as heretofore explained, and the spring $h^{15}$ will press the arm $h^{11}$ out of the path of the pin $h^9$ and permit the additional movement of the pawl $h^7$. Said trip-lever is pivotally connected to a bar $h^{16}$, slotted at its inner end. An arm $h^{17}$, rigid with the shaft 13, Fig. 40, has a projecting pin $h^{18}$, which fits within said slot. The arm is connected to the bar $h^{16}$ by springs $h^{19}$. Therefore when the shaft 13 is rotated by the auxiliary sector the pawl $h^7$ will be moved by means of the arm $h^{17}$, and when the pin $h^{10}$ and arm $h^{11}$ form a stop and prevent the arm $h^8$ from moving more than the amount necessary to move the ratchet one tooth the arm $h^{17}$ will be moved an additional distance independently of the arm $h^8$ and the bar $h^{16}$ and against the tension of the springs $h^{19}$.

In order to insure the return of the actuating arms and bars for the adding-wheels to their normal positions at the end of each operation of the machine, we have shown the rod 4, Fig. 5, adapted to be moved by contact with a spring-pressed arm $j$. The arm $d^{45}$ has a tailpiece $j'$ with a projecting pin $j^2$, which contacts with a pivoted plate $j^3$ at the end of the return movement of the shaft 1. The plate is spring-pressed into the path of said pin $j^2$, and the contact of said pin with said plate causes the rod to be moved a slight distance to insure the actuating parts being returned to proper normal position.

The complete operation of our machine is as follows: For the purpose of recording amounts to be added together we depress the keys corresponding to the amounts to be recorded, which operation results in removing the stops in each bank of keys from the path of the actuating devices. This is done by the movement of the lock-bar $a^7$ substantially as in our former patent, heretofore referred to. Upon operating the crank-handle of the shaft 1 the auxiliary operating-wheel $b^2$ is moved a preliminary distance. This is for the purpose of setting the mechanism when totalizing is done, and during this preliminary movement of the operating shaft and wheels the actuating devices are held against movement by the rod 4 pressing against the tails of said actuating devices. Upon a further movement of the main shaft 1 the auxiliary operating-wheel is moved, and the motor-spring connected therewith is wound up during the forward movement of said operating-wheel. The rod 4 extending across the machine in the path of the tails of the actuating devices is moved away from them, and the actuating arms and bars for each bank of keys wherein any one key has been depressed are moved by the weight of the corresponding type-frames and the spring within the casing of the actuating-arm, which is wound up in constructing the machine. Said actuating devices are advanced while in engagement with the adding-wheels and are arrested by the stop on the key depressed. The type-frames are moved a corresponding distance, and the position of the type-frames and adding-wheels are such that they are now adapted to record the amount indicated by the depressed keys. The type-hammers are operated in the manner heretofore described at the end of the forward movement of the operating wheel and shaft, so as to print the amounts upon the paper strip. Upon the return movement of the main operating parts the supporting-frame for the actuating devices is first raised at the beginning of the return movement by means of the pawl $c$, contacting with the pin $c^3$ on the crank-arm $c^4$, and during the return movement the actuating parts are free from the adding-wheels, so that the adding-wheels are left in their advanced positions. The auxiliary operating hub or wheel is returned to normal position by the spring wound up during the forward movement of the operating parts, which auxiliary operating device, through the bar 4, returns the actuating parts to normal position, winding up the springs within the casing of the actuating-arm. In the event the tension of the spring within the auxiliary wheel or hub is not sufficient to return all of the operating devices to normal position the catch $b^5$ on the main operating-wheel will upon the return movement engage the pin on the auxiliary wheel or hub and positively return the hub or wheel to its normal position, and the catch or pin will be released by the contact with the pin $b^{10}$ from the pin on the hub, so that the operating-wheel will move a limited distance at the end of the return movement free and independent from the auxiliary operating devices. At the end of the return movement of the operating parts by the movement of the foot $b^{42}$, as heretofore explained, the stops for holding the actuating parts against movement until a key is depressed are thrown back into normal position by the movement of the lock-bars, as heretofore explained. For the purpose of totalizing the total-key is depressed, which, as heretofore explained, releases any and all keys previously depressed, and the preliminary movement of the main operating-wheel $b^2$ locks said total-key in depressed position by means of the pivoted plate $d^{29}$. It is necessary also to operate the catch $e^7$ on the handle of the main operating-shaft, which, as heretofore explained, prevents the disconnection of the main sector $b$ from the auxiliary sector $b'$, which insures the operation of the type-hammers for printing the totals indicated by the type-frame. During this preliminary movement of the main wheel $b^2$ the arm $d^{24}$ and connecting parts are set so as to raise the supporting-frame upon further movement of the main operating-wheel $b^2$. The stops for holding the actuating devices are thrown out of their holding position by the movement of the lock-bar $a^7$ through the connection between said lock-bar and the shoulder $d^{46}$ on the arm $c^4$ of the supporting-frame. The actuating-arms are free to move forward so soon as the auxiliary hub of the wheel is advanced by the main operating-wheels and the rod 4 raises out of contact with the tails of said actuating devices, and said actuating devices and the printing-frame are advanced until the pawls $b^{14}$ engage with the teeth on the disk wheels connected with the adding-wheels. The supplementary arms $b^{26}$ thereupon lock the actuating-arms to the frame of the machine by raising the pawls $b^{28}$, as hereinbefore explained. The type-hammers are supported precisely as in the operation for recording amounts. At the beginning of the return movement of the main operating devices the locking-bar $b^{34}$ for the adding-wheels which engage the adding-wheels at the beginning of the forward movement of the auxiliary wheel or hub is thrown out of engagement with the adding-wheels; but the operating arms and bars are held locked by means of the supplementary arms $b^{26}$ until the rod 4 upon the further return movement of the operating devices contacts with the tails of the supplementary arms and actuating-arms, whereupon the pawls are released from engagement with the frame, the actuating devices are restored to normal position, and the motor mechanism for same wound up. The transfer mechanism we have already explained, and it is sufficient to say that it operates only during the operation for registering amounts when the adding-wheels are advanced. For the purpose of clearing the machine or returning the adding-wheels to normal or zero position it is necessary to press the total-key, which sets the parts, as hereinbefore explained, and operate the handle of the main shaft 1 without operating the catch $e^7$. In this way the main sector $b$ is disconnected from the auxiliary sector $b'$, and at the end of the forward movement of the main shaft 1 the double-arm link $c^7$ causes the supporting-frame to be released, thereby throwing the tooth of each actuating-bar into engagement with the adding-wheel, and thereby return the adding-wheel to its normal position or zero position upon the further return movement of the operating devices.

The ordinary device for preventing a partial movement of the operating parts is shown in Figs. 3 and 31. The bar $y'$, formed with teeth, is attached to the side of the machine. A pivoted spring-pressed pawl $y^2$ is supported by an arm $y^4$, extending from the shaft 1. The pawl $y^2$ is adapted to engage in the teeth of the bar $y^3$, so that the arm and shaft will have to continue to move in the direction in which same begin their operation until the pawl passes the end of the bar $y'$, when the spring will cause the pawl to be reversed, so that the parts can be returned. We will not undertake to explain in detail the operation of these parts, since it is a device commonly in use.

$z$ represents an ordinary dash-pot, having a plunger $z'$ connected to the shaft 1 by an arm $z^2$ for the purpose of causing the easy operation of the parts in a well-known manner.

Having thus described our invention, we claim—

1. In a calculating-machine, the combination of an operating-wheel with actuating devices, connecting mechanism between said operating-wheel and said actuating devices, adding devices operated by said actuating devices, locking devices for the actuating devices normally held out of locking position by said connecting mechanism, for the purpose specified.

2. In a calculating-machine, the combination of a main operating device with actuating devices, connecting mechanism between said main operating devices and said actuating devices, adding devices operated by said actuating devices, locking devices pivotally connected to said actuating devices normally held out of locking position by said connecting mechanism, for the purpose specified.

3. In a calculating-machine, the combination of main operating devices and auxiliary operating devices, adding devices connected to said auxiliary operating devices, spring-connecting mechanism between said main operating devices and said auxiliary operating devices, and an additional positive means adapted to cause the connection of the main and auxiliary operating devices in the event the spring connection becomes inoperative, for the purpose specified.

4. In a calculating-machine, the combination of a main operating device with an auxiliary operating device, means for moving the main operating device a predetermined distance independent of the auxiliary operating device, actuating devices and adding devices operated by the actuating devices, means for restoring the actuating devices to normal position during the time the main operating device and auxiliary operating device are connected together, for the purpose specified.

5. In a calculating-machine, the combination of an operating-shaft, a main operating-wheel and an auxiliary operating hub or wheel, means for moving the main wheel by said shaft a predetermined distance at the beginning and end of its movement, in addition to the movement of the auxiliary operating wheel or hub and independent of it, actuating devices and adding devices operated by said actuating devices, means for moving said actuating devices independent of the operating devices but adapted to be restored to normal position by the auxiliary hub or wheel, for the purpose specified.

6. In a calculating-machine, the combination with the main motor mechanism, means for winding up the motor mechanism, actuating-teeth and adding devices normally in mesh, and devices for supporting said actuating-teeth, means for causing the engagement and disengagement of the actuating-teeth and the adding devices, a main operating device adapted normally to operate the actuating devices in unison but adapted to move said supporting devices at the beginning of its movement and also at the beginning of its return movement, for the purpose specified.

7. In a calculating-machine, the combination with the main motor mechanism, means for energizing said mechanism, actuating devices and adding devices operated by said actuating devices, devices for supporting said actuating devices, a main operating device adapted to be oscillated by the motor mechanism and adapted to operate the actuating and adding devices in unison, means thrown into the path of the main operating device for causing said device to raise the supporting devices at the beginning of its movement and thereafter to operate the actuating devices independent of the adding devices.

8. In a calculating-machine, a main operating device, an auxiliary operating device, said main operating device being adapted to move a predetermined distance independent of the auxiliary operating device, actuating devices and adding devices operated by said actuating devices and normally engaged therewith, devices for disengaging the actuating devices, means controlled by the main operating device during this preliminary movement for setting the disengaging devices, and means for moving said disengaging devices by the further movement of the main operating devices, for the purpose specified.

9. In a calculating-machine, a main operating device, an auxiliary operating device, said main operating device being adapted to move a predetermined distance independent of the auxiliary operating device, actuating devices and adding devices operated by said auxiliary devices and normally engaged therewith, devices for disengaging the actuating devices from the adding devices, means controlled by the main operating device during this preliminary movement for setting the disengaging devices, and means for moving said disengaging devices by the further movement of the main operating devices, for the purpose specified.

10. In a calculating-machine, the combination of a series of banks of value-keys with a total-key, actuating and adding devices corresponding to each bank of keys, operating mechanism for said actuating devices, means connected with said total-key for setting devices adapted to be operated upon by the main operating mechanism and connected with the actuating devices for the purpose of disengaging the actuating devices from the adding devices, for the purpose specified.

11. In a calculating-machine, the combination of a series of banks of value-keys and a totalizing-key, operating devices and actuating devices, adding devices operated by said actuating devices, a pivoted supporting-frame for the actuating devices, means for raising said frame by the movement of operating devices whenever the total-key is depressed, for the purpose specified.

12. In a calculating-machine, the combination of a series of banks of value-keys with a total-key, actuating devices controlled by the value-keys, adding devices, printing devices, means for moving said actuating devices by the weight of the printing devices, and means for restoring the printing devices to normal position, for the purpose specified.

13. In a calculating-machine, the combination of series of banks of value-keys and a total-key, operating mechanism, actuating mechanism moved by said operating mechanism, adding mechanism normally in engagement with said actuating mechanism, means for disengaging said parts, means for printing, and a roll of paper for receiving the amounts printed, means for moving said roll of paper a predetermined distance and adapted to be moved an additional distance whenever said actuating and adding mechanism are disengaged at the beginning of the movement of the operating mechanism, for the purpose specified.

14. In a calculating-machine, the combination of operating mechanism, actuating mechanism and adding mechanism normally connected, means for disengaging the actuating and adding mechanism, printing mechanism and a roll for carrying the paper for the printing mechanism, devices for moving said roll a predetermined distance by connections with the operating mechanism, auxiliary mechanism also connected with said operating mechanism for automatically causing an additional movement of said roll when said actuating mechanism is moved forward and back out of engagement with the adding mechanism, for the purpose specified.

15. In a calculating-machine, the combination of operating devices, actuating devices and adding devices operated by the actuating devices, frames, spring-pressed movable type therein, means for moving said frames in unison with the actuating devices, printing-hammers connected with said operating devices, and means for moving said printing-hammers a predetermined distance by the operation of said operating devices, and devices for causing the release of said printing-hammers from the operating devices, and means for returning said hammers independently of the movement of said operating devices.

16. In the transferring mechanism of a calculating-machine, the combination of transfer-bars with adding or recording wheels, movable devices for supporting said transfer-bars, a shaft for supporting said supporting devices, a projecting part on said supporting devices having a curved surface formed thereon contacting with said transfer-bars, means for moving said supporting devices for causing the raising and lowering of said transfer-bars, for the purpose specified.

17. In a calculating-machine, a main operating device, adding-wheels and actuating devices for said wheels adapted to be connected with said main operating device, auxiliary actuating devices and printing devices operated by said actuating devices, means for holding said auxiliary actuating devices and printing devices connected, and devices for disconnecting same, and means for moving said main operating device independent of said printing devices, for the purpose specified.

18. In a calculating-machine, a main operating device, actuating and adding devices connected therewith, auxiliary actuating devices moved by the main operating device, and printing devices connected with said auxiliary actuating devices, means for disconnecting the main operating and auxiliary actuating devices from the printing devices, supporting devices for said actuating devices, locking devices for said supporting devices, means operated by said operating devices for unlocking the supporting devices at the beginning of the return movement of the main operating device, for the purpose specified.

19. In a calculating-machine, a main operating device, actuating and adding devices connected therewith, auxiliary actuating devices operated by the main operating device, and printing devices connected with said auxiliary actuating devices, means for disconnecting the operating devices from the auxiliary actuating devices and adapted to hold them disconnected during the operation of the main operating device, and means for connecting the auxiliary operating, actuating and printing devices at the end of the movement of the main operating device, for the purpose specified.

20. In a calculating-machine, a main operating device, actuating and adding devices operated thereby, auxiliary operating devices moved by the main operating device, and printing devices normally connected with said auxiliary operating devices, means for disconnecting said printing devices from the auxiliary operating devices, and supporting devices for said actuating devices, means for raising said supporting devices and means for locking said supporting devices in raised position and means for unlocking same, all operated by said auxiliary operating devices, for the purpose specified.

21. In a calculating-machine, the combination of a main operating-wheel and an auxiliary hub or wheel, with motor mechanism for said hub or wheel, means for advancing said hub by said motor-wheel in one direction for the purpose of energizing the motor mechanism, and supplemental means for connecting said main wheel and hub during movement in the opposite direction but permitting independent movement of the parts, for the purpose specified.

22. In a calculating-machine, the combination of a main wheel and a main operating device for said wheel with an auxiliary operating device, adding devices operated by said auxiliary device, motor mechanism for the auxiliary operating device moved by said main wheel, means for positively returning said auxiliary device to normal position by said main operating device and means for causing an additional movement of the main operating device independent of said auxiliary device.

23. In a calculating-machine, the combination of a main operating device and an auxiliary operating device with adding mechanism, the auxiliary operating device moved by said main operating device for operating the adding device, means for moving the main operating device a predetermined distance independent of the auxiliary operating device, a key for totalizing, and means connected with said main operating device for locking said totalizing-key both in depressed and undepressed position during the preliminary movement of said main operating device.

24. In a calculating-machine, the combination of a main wheel and an auxiliary wheel or hub with adding mechanism, the auxiliary wheel or hub moved by said main wheel for operating the adding mechanism, means for moving the main wheel or hub a predetermined distance independent of the auxiliary wheel or hub, a key for totalizing, and means connected with said main wheel or hub for locking said totalizing-key both in depressed and undepressed position during the preliminary movement of the main operating-wheel.

25. In a calculating-machine, a main operating device, an auxiliary operating device moved in one direction by said main operating device but restored to normal position independent of the movement of said main operating device, actuating devices and adding devices, with a supporting-frame for said actuating devices, a totalizing-key and means connected with the main operating device for locking said total-key and simultaneously moving said supporting-frame during its preliminary movement independent of the auxiliary operating device, for the purpose specified.

26. In a calculating-machine, a main operating device, an auxiliary operating device moved in one direction by the main operating device, means for permitting a preliminary predetermined movement of the main operating device and a predetermined movement at the end of its cycle of movement independent of the auxiliary operating device, acutating devices and adding devices normally connected, means connected with the totalizing-key for causing the main operating device to disengage the actuating devices from the adding-wheels during its preliminary movement and for causing the reëngagement of same by the movement of said main operating device at the end of its cycle of movement and while independent of the auxiliary operating device.

27. In a calculating-machine, a main operating device and an auxiliary operating device connected with said main operating device, means for disconnecting the main operating device from the auxiliary operating device, adding devices and actuating devices connected with the auxiliary operating device, transfer mechanism for said adding devices, means for returning the transfer mechanism to normal position by the movement of said main operating device after said transfer devices have been operated by the auxiliary operating device, for the purpose specified.

28. In a transfer mechanism for a calculating-machine, the combination of adding-wheels with transfer-bars having spring-pressed pivoted supports thereon, supporting-arms, shafts supporting same, curved supporting-surfaces on said supporting-arms, means for holding said supports on said surfaces, and means for moving said supporting-arms for causing said supports to move from said surfaces, for the purpose specified.

29. In a calculating-machine, the combination of a main operating device and an auxiliary operating device, adding-wheels with transfer-bars having spring-pressed pivoted supports thereon, supporting-arms, a shaft supporting same, curved faces formed on said supporting-arms, and means for moving said supporting-arms for causing the transfer, the transferring mechanism being restored to normal position by said main operating device, substantially as specified.

30. In a calculating-machine, the main operating device and the auxiliary operating device moved by said main operating device, actuating devices and adding devices, a pivoted frame for supporting the actuating devices, a totalizing-key and means set by said key and connected with said main operating device for causing the raising of said supporting-frame by said main operating device during its preliminary movement, and means for locking said supporting-frame, for the purpose specified.

31. In a calculating-machine, the main operating device and the auxiliary operating device moved by said main operating device, actuating devices and adding devices, a pivoted frame for supporting the actuating devices, a totalizing-key and means set by said key and connected with said main operating device for causing the raising of said supporting-frame, and means for locking said supporting-frame during the preliminary movement of said main operating device, and means connected with said main operating device for unlocking said supporting-frame and causing its restoration to normal position during the movement of said main operating device.

32. In a calculating-machine, a series of banks of value-keys, and a totalizing-key, operating devices adapted to be moved independent of the operation of any of said keys, actuating devices and adding devices, stops for holding said actuating devices against movement, means connected with the totalizing-key for causing the removal of said stops by the operating devices, for the purpose specified.

33. In a calculating-machine, the combination of a main operating device and an auxiliary operating device, adding devices and motor mechanism for said adding devices, adapted to be energized by the auxiliary operating device, additional means for positively moving said actuating devices and said auxiliary operating device by the main operating device at the end of its cycle of movement for the purpose of insuring the proper return of the parts.

34. In a calculating-machine, a main operating device, adding-wheels and actuating devices, said actuating devices being normally locked to the frame of the machine, a main locking device for said adding-wheels and means for releasing the actuating devices from the machine-frame, and an additional locking device controlled by the main operating device for locking the actuating devices simultaneously with the release of the locking device for the adding-wheels.

35. In a calculating-machine, the combination of the operating devices with actuating devices and printing devices, pivoted spring-pressed type-hammers for the printing devices, means connected with the operating devices for moving said printing-hammers a predetermined distance and adapted to release same at the end of the movement, and means for moving same an additional distance independent of the operating devices, for the purpose specified.

36. In a calculating-machine, the combination of the operating devices with actuating devices and printing devices, pivoted spring-pressed type-hammers for the printing devices, means connected with the operating devices for moving said printing-hammers a predetermined distance and adapted to release same at the end of said movement, movable type moved by said printing-hammers, pivoted stops for said printing-hammers for preventing the contact of said hammers with said type, means connected with the actuating devices for releasing said pivoted type-hammers from said stops, for the purpose specified.

37. In a calculating-machine, a main operating device, actuating devices, printing devices, a pivoted supporting-frame for said actuating devices, means for moving said supporting-frame by said operating device, and paper-rolls for said printing devices, means connected with said main operating device for moving said paper-rolls a predetermined distance, and also for automatically moving said paper-rolls an additional predetermined distance whenever said supporting-frame is raised by said operating device, for the purpose specified.

38. In an adding or calculating machine, series of banks of keys, operating devices, lock-bars and rack-bars for locking said keys in depressed and undepressed position, locking devices for said bars, means for simultaneously releasing said locking devices and adapted simultaneously to operate said bars for the purpose of releasing the depressed and undepressed keys, substantially as described.

39. In a calculating-machine, the combination of a main operating device, an auxiliary operating device connected with the main operating device, actuating devices connected to the auxiliary operating device, adding-wheels normally in engagement with said actuating devices, mechanism for disengaging the actuating devices from said wheels, printing devices and actuating devices therefor, and means connected with said last-mentioned actuating devices for operating said disengaging mechanism at the beginning of the return movement of the main operating device, for the purpose specified.

40. In a calculating-machine, the combination of a main operating device, an auxiliary operating device connected therewith, actuating devices connected with the main operating device, actuating devices connected with the auxiliary operating device, adding-wheels normally in engagement with said actuating devices, mechanism for disengaging said actuating devices from said wheels, auxiliary actuating devices and printing devices operated by said auxiliary actuating devices, and means connected with said auxiliary actuating devices for operating said disengaging mechanism at the beginning of the return movement of the main operating device, means for locking said disengaging mechanism, and devices connected with the auxiliary operating device for releasing the disengaging mechanism from said locking device at the end of the return movement of the auxiliary operating device, for the purpose specified.

41. In a calculating-machine, a series of banks of value-keys and a totalizing-key, a main operating device, locking devices for said value-keys for holding them in depressed position, means connected with said totalizing-key for operating said locking devices whenever the totalizing-key is depressed and further connected with said main operating device for operating said locking device near the end of the movement of the main operating device, for the purpose specified.

42. In a calculating-machine, the combination of a main operating device with actuating devices, connecting devices between said main operating device and said actuating devices, adding devices operated by said actuating devices, spring-pressed locking devices pivotally connected to said actuating devices, and means for holding said locking devices out of locking position by said connecting mechanism, for the purpose specified.

43. In a calculating-machine, the combination of a main operating device with actuating devices, connecting devices between said operating device and said actuating devices, adding devices operated by the actuating devices, locking devices for said actuating devices and locking devices for said adding devices, means for throwing said first-mentioned locking devices into locking position when the locking devices for said adding devices are thrown out of locking position, for the purpose specified.

44. In a calculating-machine, the combination of a main operating device with actuating devices, connecting mechanism between said operating device and said actuating devices, adding devices operated by said actuating devices, pawls pivoted on said actuating devices and supplementary arms pivotally connected to said actuating devices normally held against movement by said connecting mechanism, and means for operating said supplementary arms and thereby operating said pivoted pawls during the movement of said main operating device, for the purpose specified.

45. In a computing-machine, a main operating device, value-keys, and a total-key, actuating devices and adding devices actuated thereby, stop devices operated by said value-keys, and means set by the total-key and operated by the main operating device for operating said stop devices independent of the value-keys, for the purpose specified.

46. In a computing-machine, an operating device, a series of value-keys and a supplemental key, stop devices operated by the depression of a value-key, mechanism set by the supplemental key and operated by the main operating device for moving said stop devices independent of the depression of the value-keys, for the purpose specified.

47. In a computing-machine, a main operating device, actuating devices and adding devices, a supporting-frame connected with said actuating devices, means operated by said operating device for raising said frame at the beginning of the movement of said main operating device, and means for raising said frame at the beginning of the return movement of said operating device, for the purpose specified.

48. In a computing-machine, an operating device, an actuating device and parts actuated thereby, a supporting-frame connected to said actuating device, normally adapted to be raised at the beginning of the return movement of the main operating device, a total-key, and means set by said total-key and operated upon by said main operating device for raising said frame at the beginning of the movement of the main operating device, for the purpose specified.

49. In a computing-machine, a main operating-wheel, a main sector and an auxiliary sector operated by said main operating-wheel, printing devices and means connecting said printing devices to said auxiliary sector, a total-key, and means set by said total-key for causing the main operating-wheel to operate said main sector independent of the auxiliary sector, for the purpose specified.

50. In a computing-machine, a main operating device, printing devices, and an actuating device for said printing devices, means normally connecting said main operating device and said printing actuating device, a total-key adapted to disconnect the same, a crank for operating said main device and a pawl connected therewith adapted to prevent the disconnection of said main operating device and said actuating printing device when the total-key is depressed, for the purpose specified.

51. In an actuating device, a series of value-keys, a locking-bar for said keys, a main operating device, and flexible devices adapted to raise said locking-bars by the movement of the main operating device, for the purpose specified.

52. In a calculating-machine, the combination of a main operating device with printing devices and paper-rolls, and actuating devices for said rolls, the said printing actuating device being always maintained in engagement with the printing device, means connected with said main operating device for controlling said actuating device so as to permit same to move said paper-rolls automatically an additional predetermined distance while maintaining them in engagement therewith, for the purpose specified.

53. In a calculating-machine, the combination of a main operating device, printing devices, including paper-rolls, mechanism connecting said rolls and the main operating device for moving the rolls a predetermined distance, a totalizing-key, and means controlled by said totalizing-key and operated by said main operating device for permitting said main operating device to move said rolls an additional distance, for the purpose specified.

54. In a calculating-machine, the combination with a main operating device, a totalizing-key, and a clearing-out key, printing devices and spacing mechanism connected to said printing devices and said main operating device, means controlled by said totalizing-key and operated by said main operating device for giving an additional movement to said spacing devices, and means controlled by said clearing-out key for automatically cutting out said spacing device, for the purpose specified.

55. In a calculating-machine, the combination of a main operating device, paper-rolls and printing devices including an actuating device for said paper-rolls, means connected with said main operating device for moving said actuating device a predetermined distance, and means for causing said main operating device to move at predetermined times an additional distance independent of the said actuating device, a totalizing-key and connections with said actuating device whereby when said key is depressed said actuating device will move an additional distance in unison with the main operating device, for the purpose specified.

In testimony whereof we have hereunto set our hands this 13th day of April, A. D. 1903.

AUGUST SCHNEIDER.
JOSEPH PERFLER.

Witnesses:
HARRY C. LOTT,
WILLIAM A. BURKE,